United States Patent [19]

Ulrich et al.

[11] Patent Number: 5,396,265
[45] Date of Patent: Mar. 7, 1995

[54] THREE-DIMENSIONAL TACTILE COMPUTER INPUT DEVICE

[75] Inventors: Karl T. Ulrich, Belmont; Marc Filerman, Watertown; Emanuel Sachs, Somerville; Andrew Roberts, Charlestown; Todd Siler, Cambridge; Daniel J. Berkery, Boston; David C. Robertson, Wakefield, all of Mass.

[73] Assignee: Massachusetts Institute of Technology, Cambridge, Mass.

[21] Appl. No.: 583,649

[22] Filed: Sep. 17, 1990

[51] Int. Cl.$^6$ .................. G09G 5/08; G06F 15/00
[52] U.S. Cl. ...................... 345/158; 345/156; 364/474.24
[58] Field of Search ............. 364/474.22, 474.24, 364/474.11; 395/82, 97, 919, 159; 414/5; 340/709, 710, 706, 798; 345/163, 156, 157, 158

[56] References Cited

U.S. PATENT DOCUMENTS

| 4,533,910 | 8/1985 | Sukonick et al. | 340/798 |
|---|---|---|---|
| 4,904,914 | 2/1990 | Seki et al. | 340/710 |
| 4,987,527 | 1/1991 | Hamada et al. | 340/709 |
| 4,988,981 | 1/1991 | Zimmerman et al. | 340/709 |
| 4,998,206 | 3/1991 | Jones et al. | 364/474.24 |
| 5,023,800 | 6/1991 | Carver et al. | 395/719 |
| 5,038,144 | 8/1991 | Kaye | 340/706 |
| 5,059,958 | 10/1991 | Jacobs et al. | 340/706 |
| 5,068,645 | 11/1991 | Drumm | 340/710 |
| 5,122,785 | 6/1992 | Cooper | 345/163 |
| 5,134,560 | 7/1992 | Ferriter et al. | 395/159 |
| 5,184,319 | 2/1993 | Kramer | 340/706 |

FOREIGN PATENT DOCUMENTS 2161755 1/1986 United Kingdom .

OTHER PUBLICATIONS

Foley, James D., "Interfaces for Advanced Computing", Scientific American, vol. 257, Oct. 1987, 126–135.
Kaufman, A. and Bakalash, R., "The Cube System as a 3D Medical Workstation" SPIE vol. 1083, Three-Dimensional Visualization and Display Technologies, (1989), pp. 189–194.
McAvinney, Paul, "Telltale Gestures, 3-D applications need 3-D input", BYTE, Jul. 1990, pp. 237–240.
Ashbrook, Tom, "You are about to enter another reality . . . ", Boston Globe.

Primary Examiner—Alvin E. Oberley
Assistant Examiner—Steven J. Saras
Attorney, Agent, or Firm—Hamilton, Brook, Smith & Reynolds

[57] ABSTRACT

A tactile computer input device which simulates an object being designed is used with a computer aided design (CAD) system. The input device allows a user to manually manipulate the input device as if it were the object under design. A preferred embodiment is directed toward the design of sheet metal parts. The design begins with a virtual metal sheet which is then manipulated by a user through manual manipulation of the input device. Bending of the virtual object is accomplished by bending of the input device. Stretching and shrinking of the virtual object is accomplished by expanding and compressing the input device. Spatial orientation of the virtual object follows the spatial orientation of the input device by providing the input device with a Polhemus orientation sensor. Other functions for manipulating the virtual sheet metal object include cutting, embossing, and punching.

44 Claims, 11 Drawing Sheets
Microfische Appendix Included
(2 Microfiche, 138 Pages)

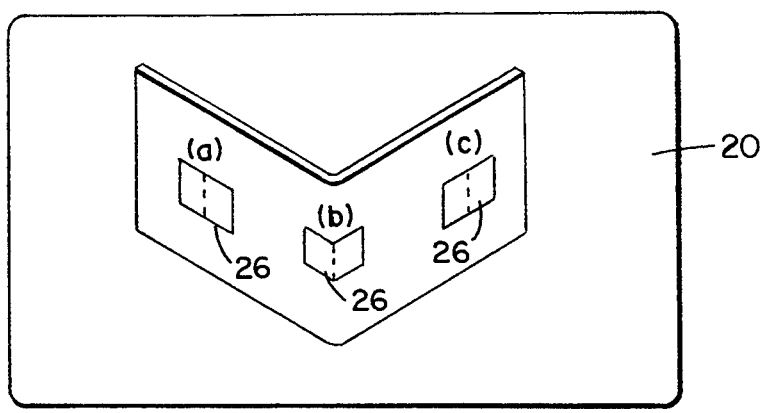
FIG. 4
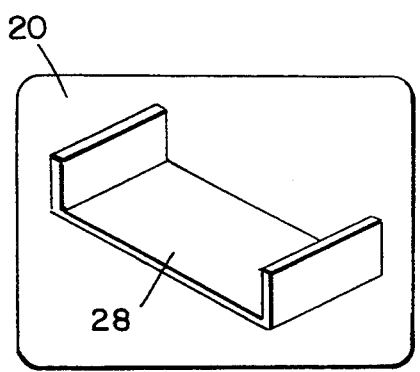
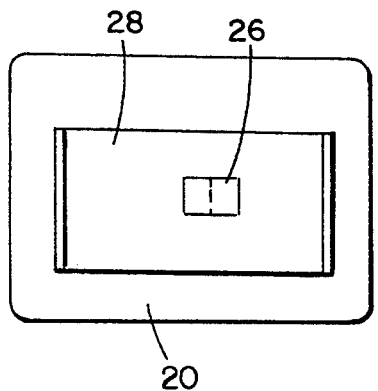
FIG. 5A    FIG. 5B
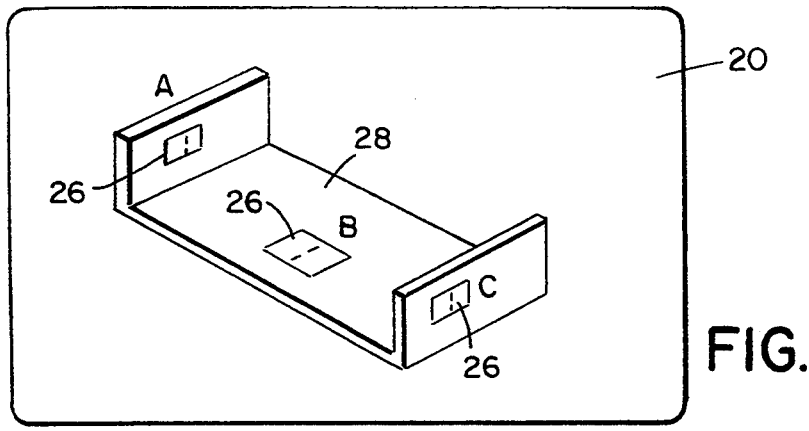
FIG. 5C

FIG. 14A

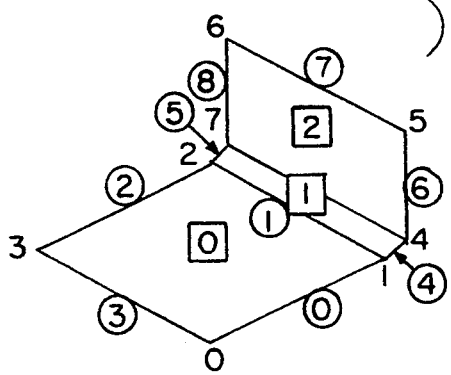

- ⓧ = EDGES
- x = VERTICES
- ☒ = PACES

FIG. 14B
FACE LIST

| INDEX | FACE TYPE | FIRST EDGE | PACE INDENT | NUM POINTS | PROC FLAG |
|---|---|---|---|---|---|
| 0 | PLANE | 0 | 0 | 4 | 0 |
| 1 | BEND | 4 | 1 | 4 | 0 |
| 2 | PLANE | 6 | 2 | 4 | 0 |

EDGE LIST

| INDEX | START | END | POS PACE | NEG PACE | PREV POS | NEXT POS | PREV NEG | NEXT NEG | EDGE TYPE | PROC FLAG |
|---|---|---|---|---|---|---|---|---|---|---|
| 0 | 0 | 1 | 0 | NULL | 3 | 1 | NULL | NULL | STRAIGHT | 0 |
| 1 | 1 | 2 | 0 | 1 | 0 | 2 | 5 | 4 | STRAIGHT | 0 |
| 2 | 2 | 3 | 0 | NULL | 1 | 3 | NULL | NULL | STRAIGHT | 0 |
| 3 | 3 | 0 | 0 | NULL | 2 | 0 | NULL | NULL | STRAIGHT | 0 |
| 4 | 4 | 1 | NULL | 1 | NULL | NULL | 1 | 9 | STRAIGHT | 0 |
| 5 | 2 | 1 | NULL | 1 | NULL | NULL | 9 | 1 | STRAIGHT | 0 |
| 6 | 4 | 5 | 2 | NULL | 9 | 1 | NULL | NULL | STRAIGHT | 0 |
| 7 | 5 | 6 | 2 | NULL | 6 | 8 | NULL | NULL | STRAIGHT | 0 |
| 8 | 6 | 7 | 2 | NULL | 7 | 9 | NULL | NULL | STRAIGHT | 0 |
| 9 | 7 | 4 | 2 | 1 | 8 | 6 | 4 | 5 | STRAIGHT | 0 |

FIG. 14C

THREE-DIMENSIONAL TACTILE COMPUTER INPUT DEVICE

GOVERNMENT SUPPORT

The work described herein was supported in part by The Department of Defense under Office of Naval Research Contract N0014-85K-0124.

Microfiche Appendix

This application is being filed with a microfiche appendix containing a computer program listing. The appendix contains two microfiche with 116 total frames.

BACKGROUND OF THE INVENTION

In recent years, computers have played an increasing role in the design of mechanical parts. Current trends toward complete design automation have motivated the development of Mechanical Computer-Aided Design (MCAD) systems equipped with powerful analytical tools that enable designers to iteratively optimize and refine designs prior to prototyping.

Current MCAD systems incorporate the traditional keyboard and stylus or mouse input devices. While familiar, these devices may be clumsy and difficult to use and may actually hinder designer creativity. Consequently, MCAD systems are used primarily in the latter stages of the design process for numerically intensive analysis and detailed drawing. One of the primary limitations of these devices is that they are inherently two dimensional. Three dimensional information can not be directly transmitted to the system. It is believed that the primary reason many systems are used as design verification tools rather than as true design tools is that their human interfaces are too awkward. These interfaces do not offer designers the flexibility to easily create and modify a design.

Various recent research efforts that focusing on three dimensional input devices have used the Polhemus 3 Space six degree of freedom input device. This device uses low frequency magnetic waves to provide 3-D position and orientation of sensor relative to a stationary source. VPL Research, Redwood City, Calif. has incorporated Polhemus devices in their "Eyephone" and "DataGlove" products. The former is a head mounted display device that provides the user with a stereoscopic view of a virtual world. The Polhemus sensor tracks 3-D head movements and enables the computer to match the viewer's position and orientation in the virtual world with their absolute position and orientation in the real world. The "DataGlove" is literally a glove worn on a user's hand that sends different signals to the host computer based on the user's hand postures. A Polhemus sensor mounted near the wrist tracks the 3-D position of the user's hand in 3-space. When used together, the "Eyephone" and "DataGove" enable users to interact with the virtual world.

SUMMARY OF THE INVENTION

In accordance with the present invention, a computer aided design system includes a data processor which receives data inputs and generates a representation of an object under design. The representation generated by the data processor is received by a display monitor which provides a visual display to a system user. A hand-held input device is used to provide data inputs to the data processor. The input device represents a simulation of the object under design such that changes in the input device due to manual manipulation of the input device result in similar changes to the representation output by the data processor.

In a preferred embodiment, the simulation of the object under design includes the use of an orientation sensor. The orientation sensor provides an output indicative of the spatial orientation of the input device. Preferably, the orientation sensor uses a magnetic source which is stationary relative to a magnetic sensor which moves with the input device.

The preferred embodiment also includes a hinge which holds two pieces of the input device together. Thus, the input device bends at the hinge as a result of manual manipulation of the input device. The bending of the input device generates an output to the data processor which results in a similar bending of the representation generated by the data processor.

The preferred embodiment further includes a compression switch activated by a compression of the input device during manual manipulation by a user. Activation of the compression switch results in a reduction in size of the representation generated by the data processor along one directional axis. Similarly, an expansion switch is provided which is activated by expansion of the input device. Activation of the expansion switch results in an increas in size of the representation generated by the data processor along one directional axis.

In addition to the representation generated by the data processor, a display icon is also generated by the data processor in response to data inputs from the input device. The display icon is displayed in addition to the data processor representation. The spatial orientation of the display icon follows the spatial orientation of the input device, and is controllable independent of the data processor representation.

With the preferred embodiment, an input from the input device to the data processor is also provided to initiate a cutting of the representation generated by the data processor. The cutting of the representation allows a severing of the object representation, and removal of a severed portion.

BRIEF DESCRIPTION OF THE DRAWINGS

FIG. 4 is an illustration of the movement of an input device icon on the screen display of the CAD system of FIG. 1.

FIG. 5A is an illustration of an object on a screen display of the CAD system of FIG. 1.

FIGS. 5B and 5C illustrate orientation of an input device icon on different planes of the object displayed on the display of FIG. 5A.

FIGS. 14A, 14B and 14C illustrate an object under design and tables associated with the identification of different components of the object as identified by the CAD system of FIG. 1.

DETAILED DESCRIPTION OF THE PREFERRED EMBODIMENT

Figure 1:
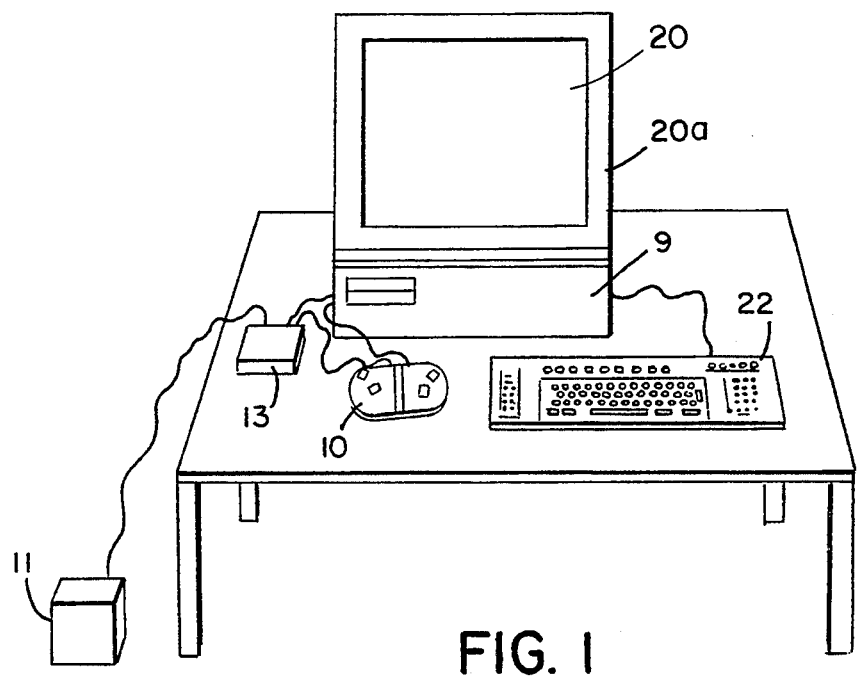
FIG. 1 is an overall view of a computer aided design (CAD) system according to the present invention.

Shown in FIG. 1 is a computer aided drafting (CAD) system including an input device 10 to a computer 9 having display monitor 20a and keyboard 22. Also shown is the source unit 11 and an electronic processing unit 13 for a Polhemus sensor, produced by VPL Research Inc.

The Polhemus sensor is a three dimensional absolute position sensor which has a source with three antenna coils positioned at right angles to one another. The source emits three pulses in sequence, one from each antenna. The input device 10 has a receiver of the Polhemus sensor within it. The receiver also has three coils positioned at right angles to one another. The pulses from the source induce a current in the coils of the receiver. The current in each coil depends on the distance of the coil from the source and the orientation of the receiver relative to the source. The computer of the CAD system calculates the position of the input device 10 from the nine current values induced in the receiver coils. The system can operate in two distinct modes; Design Mode and Menu Mode. A user gains access to the modes and functions by pressing the appropriate buttons on the input device.

Figure 2:
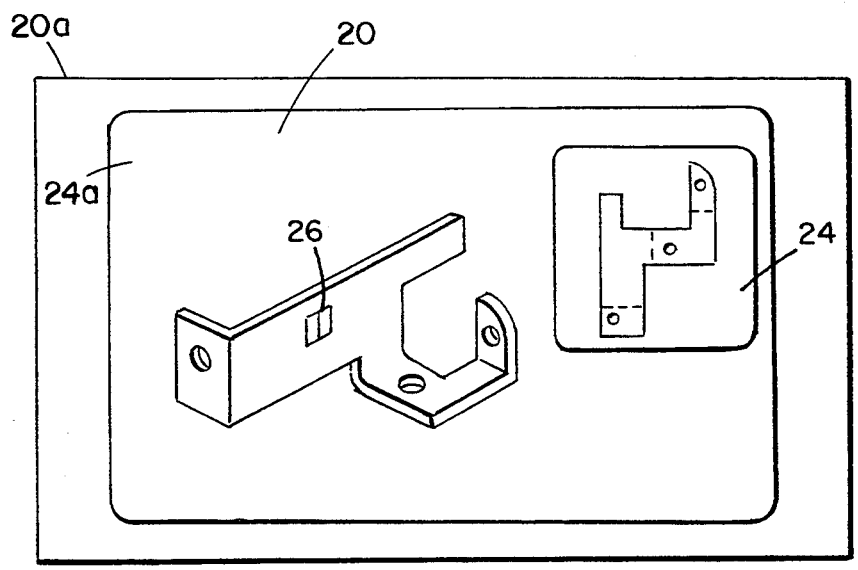
FIG. 2 is an illustration of a screen display of the CAD system of FIG. 1.

Design mode is the system default. When a user first enters the CAD system, the system is in Design mode and the user is presented with two distinct views: a large window containing a flat virtual sheet metal piece shown in perspective view and a smaller window containing some other view or views of the virtual metal part. These windows are the primary means for interacting with the system. An example of the two windows, after a virtual design piece has been cut and bent, is shown in FIG. 2. As shown, the large window 24a shows a three-dimensional perspective view of the part, and the smaller window 24 shows a flat two-dimensional view of the part. An additional example is that which is in the current program listing of the microfiche appendix. In that implementation, the smaller window contains three stationary view of the part—a front view, a top view, and an isometric view. These view remain fixed as the view in the large window is rotated.

A small virtual input device 26, similar in shape to the actual input device, is shown on a plane of the virtual sheet metal piece. This icon 26 may be moved about the planes of the virtual material by the user through manipulation of the input device 10.

In Design mode, the sheet metal CAD system enables engineers to create parts by performing various production-like design operations on the virtual piece of sheet metal using the hand held input device 10. Tactile and spatial inputs received from the device 10 are interpreted as design function commands by the system's software. Eight design functions are available to the user in this mode:

Move,
Bend,*
Cut/Emboss,*
Punch,*
Stretch,*
Shrink,*
Lock, and
Undo.

All parts must be created from the piece of virtual material using these functions. Of the eight, five design functions are termed active because they enable users to actively alter the geometry of the virtual sheet metal piece. These five active design functions are labeled with an asterick (*) in the above list.

The Bend function allows bends of ±180° to be placed in the virtual sheet metal piece at arbitrary locations and orientations. The Cut/Emboss and Punch functions enable designers to modify the perimeter of the virtual part and remove material, or punch holes in the virtual sheet metal piece. The Stretch and Shrink functions allow users to modify the overall dimensions of the part by adding or removing virtual material in specified locations.

The remaining three functions are support functions that help users achieve the correct part geometry. The Move function allows the virtual input device to be moved to different locations on the virtual sheet metal piece. Such movements enable bends and cuts to be placed at arbitrary positions in the sheet. The Lock function allows the virtual part to be viewed from any arbitrary angle. Finally, the Undo function enables users to sequentially "undo" previously performed design operations.

In Menu mode users may modify the operation of all design functions and system defaults, and alter the default viewing parameters. In this mode the screen icon is changed from the virtual input device 26 to a solid black arrow. This arrow does not interact with the virtual sheet metal part and is used much like a mouse arrow simply to display and select options from popup, hierarchial menus of the system software. Selections are made from these menus by pressing the appropriate button on the input device. Detailed descriptions of the Design and Menu modes are discussed hereinafter.

Figure 3:
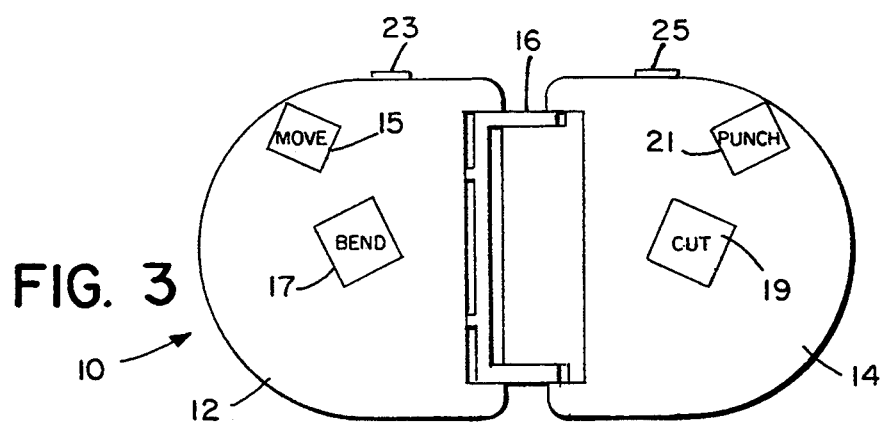
FIG. 3 is a front view of an input device of the CAD system of FIG. 1.

Shown in FIG. 3 is the tactile input device 10 having three main components: the left body section 12, right body section 14, and hinge assembly 16. Each body half contains several momentary switches that enable user to select and perform desired design functions. Also shown are several push-buttons. The Move button 15, the Bend button 17, the Cut button 19, and the Punch button 21 are all on the front of the input device 10. Lock button 23 and Undo button 25 are positioned along the top of the input device 10.

The device has two degrees of freedom—the two body halves 12, 14 may be rotated or translated relative to one another. The rotation of the body halves 12, 14 relative to one another allows a bending operation to be performed on a sheet metal object depicted on a computer aided drafting (CAD) system. Similarly, the translation of the two body halves relative to one another allows shrinking and stretching operations to be performed on the depicted object.

The hinge assembly 16 houses a rotary position sensor that measures the angular displacement between the body halves 12, 14 during a bending operation. The left body 12 contain a linear position sensor that measures the distance between the halves during a stretching or shrinking operation. Movements of the body halves relative to one another enable the stretch and shrink functions. The physical alterations of the input device comprise the tactile nature of the device. However, spatial information is also transmitted to the system.

Spatial information from the input device 10 is relayed to the system software by the Polhemus sensor receiver which is mounted in the right body half 14. This sensor measures the absolute position and orientation of the device in three-space relative to the Polhemus source 11. Such information is required by most of the design and menu functions of the supporting CAD software in order to correctly map the screen to the actual input device 10.

The input device 10 is a simulation of an object being created, represented by a virtual part on the screen 20 of the CAD system. By using buttons on the input device 10 to start and stop different operations, the input device 10 is moved in three dimensions to perform the different design functions. The input device is moved as if it were the actual part being designed, thus giving the designer "hands-on" control of the article being designed.

To align the spatial orientation of the input device 10 with the virtual part on the display screen 20, an icon 26 is displayed on the screen which mimics the movement of the input device in three dimensions. A user moves the input device to locate the icon 26 in the proper position and orientation on the display screen 20, and then begins an operation on the part using the buttons provided on the input device 10.

All of the design functions of the input device 10 follow a similar procedure protocol. For instance, to move the virtual input device 26 to a new position on the part, the user presses and holds the Move button 15, moves the icon 26 to the desired location by moving the physical input device 10, then releases the button 15 to implement the change in position. Similarly, to place a bend in the design object a user presses and holds the Bend button 17, specifies the bend magnitude by bending the input device 10 in three-space about hinge assembly 16, then releases the button 17 to implement the bend. All of the active design functions follow this "press and hold", perform an action, "then release" pattern.

The system is designed to execute a given design function only when prompted by the user, i.e. the user must actively press a button or engage a switch in order to perform a design operation. For example, the virtual input device 26 may be repositioned on the virtual material only when the Move button is pressed. The default operation of the input device 10 is inactive. This feature ensures that only intentional changes are made to the virtual piece of sheet metal.

A detailed description of each design function is as follows:

Move Function

The move function enables designers to reposition the virtual input device icon 26 with respect to the object representing the virtual sheet metal piece. Movements of this icon 26, relative to the virtual part, are necessary to allow cuts, bends and holes to be placed in the material at desired locations.

To execute a Move operation, the designer performs the following steps:
i) Press and hold the Move button;
ii) Move the physical input device in three-space until the screen icon is positioned and oriented correctly;
iii) Release the Move button.

The Move button switch closure triggers two events initially. First, a snapgrid appears on the part plane containing the virtual input device icon 26. During translation movement, the icon's midpoint will snap to the grid-line intersections. Second, a pop-up window showing the current position of the icon's center appears in the lower right hand corner of the screen. The position coordinates are given relative to a highlighted corner of the virtual part plane.

While the Move button is being held, three dimensional translations and rotations of the actual input device 10 are mapped to three dimensional translations and rotations of the input device icon 26 seen on the screen 20. The input device reference frame is inertial, and at all times the absolute orientation of the input device icon 26 is consistent with that of the input device 10.

Leftward translations and rotations of the actual input device 10 always correspond to leftward translations and rotations of the virtual input device 26, regardless of the orientation of the physical device 10 and the orientation of the virtual sheet metal part. Similarly, up and down motion of the input device corresponds to up and down motion of the icon 26 on the display screen 20. In addition, the third dimension of input device 10 motion is mapped to the vertical direction of the display screen 20. Thus, moving the input device 10 toward the screen results in the device icon 26 moving upward on the screen 20, and moving the device away from the screen results in the icon 26 moving in a downward motion. This mapping of the input device 10 motion provides a designer with an intuitive feel while viewing the perspective view of the part on the screen. Since most perspective views are from above rather than below, the cursor moving downward on the screen appears to move slightly forward on a part displayed in such a perspective.

Virtual input device movements are confined to the planes of the virtual sheet metal piece, i.e. the icon 26 can not be moved out of, or off the virtual part planes. Similarly, the icon may not be moved across cuts in the virtual part. However, the icon 26 may be moved around bends in the material. When the icon's midpoint encounters a bend, each icon half snaps to one of the planes that form the bend.

The virtual input device icon 26 may be moved between virtual part planes. During this type of movement, the icon will change its shape in order to retain angular correspondence to the physical input device 10. For example, FIG. 4 demonstrates three different positions of the icon 26 while displayed during a left-to-right translation of the input device while it is held vertically in the designer's hands.

The specific planes onto which the icon 26 can move is determined by the orientation in which the virtual part is being viewed. The virtual input device icon 26 may be moved only between virtual part planes which appear to overlap. For example, FIG. 5B depicts the "U" shaped part 28 of FIG. 5A as viewed from above. In this view, the icon 26 cannot be moved on the vertical part planes. If the part 28 were viewed from a different angle, such as the perspective angle of FIG. 5C, access to all virtual part planes would be gained.. Movements directly from one vertical plane to the other would not be permitted in this view, however. The virtual input device icon 26 is always visible from both sides of the virtual part planes.

Releasing the Move button stores the icon's final position, removes the snap-grid and closes the pop-up window.

Bend Function

The Bend function enables designers to place bends of any magnitude in the virtual piece of material. All bends are subject to material constraints imposed by the system.

To bend the virtual sheet metal piece, the designed will perform the following operations:
 i) Position and orient the virtual input device icon in the desired location using the Move function;
 ii) Press and hold the Bend button;
 iii) Select the desired bend magnitude by bending the input device along the hinge region; and
 iv) Release the Bend button.

Figure 6:
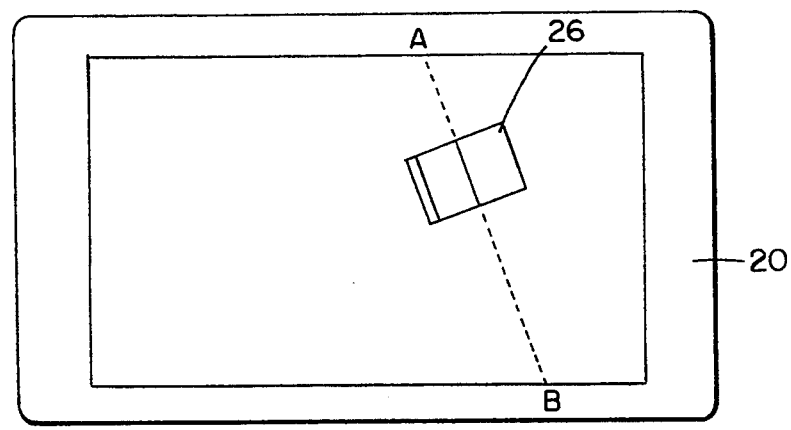
FIG. 6 shows the extension of a dotted line from the input device icon during a Bend function.

With the virtual input device 26 in the desired position, pressing the Bend button 17 triggers three events. First, the icon 26 is fixed in place on the virtual sheet metal piece. Second, the icon's center-line extends in either direction until it encounters either the virtual part plane's boundary, or a cut in the part. This extension defines the center-line around which the part will be bent, and is demonstrated in FIG. 6. Third, a pop-up window showing the current bend magnitude appears in the lower right-hand corner of the screen. This information allows the designer to place bends of precise magnitudes in the virtual sheet metal part.

An "Illegal Bend" error message is flashed if the current bend line intersects an existing bend line on the part. Only simple bends are permitted with the system. Compound bends with intersecting bend lines are not allowed. Subsequent to displaying the error message, the system terminates the bend operation.

During the actual bending operation, the position of the input device icon 26 relative the virtual sheet metal piece is held constant and the angular displacements of the actual input device 10 are mapped to the angular displacements in the virtual sheet metal planes. This mapping is one-to-two. This is, the virtual sheet metal part image is bent two degrees for every one degree of bend in the actual input device. In addition, a ghost image of the previous part geometry remains, allowing the designer to assess the consequences of the bending operation. Finally, the system performs automatic interference checking and alerts the user if the current bend will cause virtual part planes to intersect.

Releasing the Bend button 17 removes the ghost image and closes the pop-up window.

Modifying or removing an existing bend in the virtual sheet is as simple as placing the initial bend. A user need only follow the procedure outlined above. Once the icon 26 has been positioned over the existing bend, pressing and holding the Bend button 17 will cause the planes which form the existing bend to snap to the current angle made by the actual input device. In addition, bends may be removed from the virtual material by using the Undo function.

Cut/Emboss Function

The Cut and Emboss functions may be used to cut and emboss the interior of the virtual material or to modify the perimeter of the sheet. The Cut function enables both straight and curved cuts of any length or radius, to be placed in the virtual piece.

To perform either of these operations, users must first select the desired function and cut type. The selection is made by pressing the Cut button 19 twice rapidly, and holding it down. This operation is analogous to the "double-clicking" of a standard mouse button, except it requires the user to hold the button down after the second button "click".

"Double-clicking" the Cut button 19 causes a pop-up window to appear on the screen. The window contains the words "Straight", "Arch" and "Emboss", the first of which is highlighted. Back and forth movements of the input device 10 in three space alternately cause each word to be highlighted. Users select the highlighted operation simple by releasing the Cut button 19. Once the selection is made, the pop-up window is closed.

Straight Cuts

To place straight cuts in the virtual sheet metal piece, the designer will perform the following operations:
 i) Select Straight cut mode;
 ii) Position and orient the virtual input device icon in the desired location using the Move function;
 iii) Press and hold the Cut button;
 iv) Select the desired cut endpoint position; and
 v) Release the Cut button. Once the icon 26 is in the desired position, a user can begin the cutting operation. Pressing the Cut button 19 triggers four events. First, the system records the position of the virtual input device 26 and defines it as the cut start-point. Second, the virtual input device 26 icon changes to a saw-like icon. This change informs designers that they have successfully entered the Cut mode. Third, a snap-grid appears on the part plane containing the saw icon. During the actual cutting operation, the cut endpoints snap to the grid-line intersections. Finally, a pop-up window showing the cut start-point, current end-point and cut length, appears in the lower right hand corner of the screen.

During the actual cutting operation, the cut end-point is specified by moving the icon around the virtual sheet metal planes. In a mapping scheme very similar to the Move mapping, three dimensional translations of the actual input device 10 cause three dimensional translations of the saw-like icon on the planes of the virtual sheet. Rotational information is neglected in this mapping scheme and the input device reference frame is again inertial, i.e. leftward movements of the input device correspond at all times to leftward movements of the screen icon. A line is drawn from the cut start-point to the current icon position to inform the designer where the cut will be placed.

Releasing the Cut button 19 removes the snap-grid and any loose virtual material and closes the pop-up window.

Many types of cuts may be made in the virtual material: cuts from an exterior edge to an interior point; cuts from an interior point to another interior point, and; cuts from one external edge to another. For cases requiring the removal of large sections of virtual material, the user decides which piece to retain simply by positioning the virtual input device onto the desired area, after the cut is made and pressing the Cut button 19.

Arc Cuts

To place arc cuts in the virtual sheet metal piece, the designer performs the following operations:
  i) Select Arc cut mode;
  ii) Position and orient the virtual input device icon in the desired location using the Move function;
  iii) Press and hold the Cut button;
  iv) Select the desired cut end-point position;
  v) Release the Cut button;
  vi) Select the desired arc shape; and
  vii) Press the Cut button once and release.

Pressing the Cut button the first time triggers the same four events as described previously: the system records the position of the virtual input device and defines it as the cut starting-point; the virtual input device icon changes to a saw-like icon; a snap-grid appears on the part plane containing the icon, and a pop-up window showing the cut start-point, current end-point and cut length, appears in the lower righthand corner of the screen.

Figure 7A:
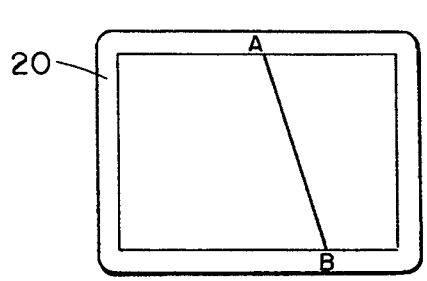
FIGS. 7A–7C show the different stages of an arc cut of an object on the screen display of the CAD system of FIG. 1.

The procedure used for specifying the arc cut endpoint is identical to that of the straight cut, i.e. the user will position the icon in the desired location on the virtual part plane by moving the input device in three-space. The icon snaps to the grid-line intersections. A dashed line is drawn from the cut start-point to the current icon position to inform the designer where the eventual cut will start and end as shown in FIG. 7A.

Figure 7B:
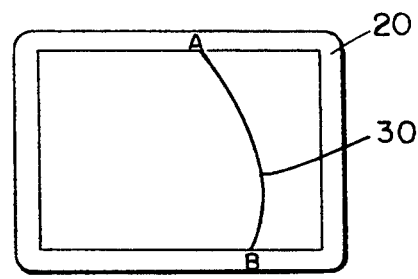
Figure 7C:
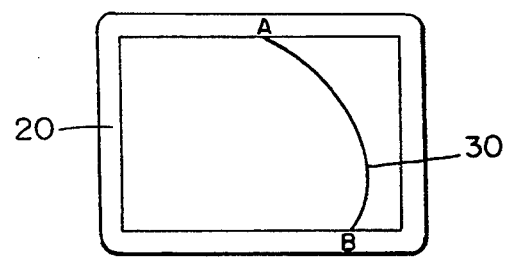

Releasing the Cut button 19 causes several events to occur. First, the system records the final icon position and defines that position as the arc cut end-point. Second, the dashed line previously drawn between the cut's starting and ending points is removed. Third, the cut function icon 30 snaps to the midpoint of an arc drawn between the cut start-point, end-point and current icon position. Subsequent movements of the icon 30 on the virtual part planes alter the shape of the arc. The particular shape of the arc is controlled by where the icon 30 is located between the two end-points, as demonstrated in FIGS. 7B and 7C. The final arc shape is determined by pressing the Cut button 19 one final time. Pressing the Cut button removes the snap-grid and any severed virtual material and closes the pop-up window.

Embossments

To place an embossment in the virtual sheet metal piece, a designer performs the following operations:
  i) Select Embossing mode,
  ii) Position and orient the virtual input device icon in the desired location using the Move function,
  iii) Press and hold the Cut button,
  iv) Select the desired endpoint position,
  v) Release the Cut button.

These operations are identical to the operations performed to place a straight cut in the virtual material except that the user is in a different mode.

Pressing the Cut button 19 triggers four events which are similar to the ones described previously. First, the system defines the position of the virtual input device as the embossment start-point. Second, the virtual input device icon 26 changes from the virtual input device to a mallet-like icon. This informs the user that the embossing mode has been entered. Third, a snap-grid appears on the part plane containing the new icon. Finally, a pop-up window showing the embossment start-point, current end-point and embossment length, appears in the lower right hand corner of the screen.

As before, the user positions the icon in the desired location on the virtual part plane by moving the input device 10 in three-space. The icon snaps to the grid-line intersections. A solid, heavy line is drawn from the embossment start-point to the current icon position to inform the designer where the eventual embossment will start and end.

Releasing the Cut button 19 removes the snap-grid and closes the pop-up window.

Punch Function

The Punch function allows pockets of any closed, regular polygon shape and size to be placed in the virtual sheet metal part at arbitrary locations. This function is similar to the Cut function in that it enables the designer to modify both the interior and the perimeter of the virtual sheet metal part.

To perform a punching operation, the user must first select the desired punch geometry. The selection is made by "double-clicking" the Punch button 21 in manner identical to the method used to select the cutter type. Double-clicking the Punch button 21 causes a pop-up window to appear on the screen. The window contains the words "Round", "Square" and "User Specified", the first of which is highlighted. The user selects the desired shape by moving the input device 10 in three-space to highlight the different options, then releasing the Punch button 21 when the desired punch type is highlighted. Once the selection is made, the pop-up window is closed.

To place a pocket in the virtual sheet metal piece, the designer performs the following operations:
  i) Select Punch type,
  ii) Position and orient the virtual input device icon in the desired location using the Move function,
  iii) Press and hold the Punch button,
  iv) Select the desired pocket radius,
  v) Release the Punch button.

With the virtual input device 26 in the desired position, pressing Punch button 19 triggers four events. First, the system records the position of the virtual input device 26 and defines it as the pocket's center. Second, the virtual input device icon 26 changes to a punch-like icon. This change informs designers that they have successfully entered the Punch mode. Third, a snap-grid appears on the part plane containing the punch icon. During the actual punching operation, the icon snaps to the grid-line intersections. Finally, a pop-up window showing the punch center position and current effective diameter, appears in the lower right hand corner of the screen.

During the actual operation the punch size is specified by the icon's position relative to the previously-selected center point of the punch. For circular cross-sections, icon movements specify the actual circle radius. For polygonal shapes these movements specify the distance from the center point to one corner of the polygon. In each case, the appropriate shape is drawn on the virtual part planes centered around the specified center point.

Releasing the Punch button 21 removes the snap-grid and any severed virtual material and closes the pop-up window. As before, the process for removing severed virtual material is simply to position the virtual input device on the desired virtual part area then press the Punch button. This action will cause the undesired piece to disappear.

Stretch and Shrink Function

The Stretch and Shrink functions enable designers change the overall dimensions of the entire virtual sheet, and/or lengthen or shorten specified portions of the material. Conceptually, these functions stretch or shrink the sheet by adding or removing virtual material.

To stretch or shrink the virtual sheet metal piece, a designer performs the following operations:
 i) Position and orient the virtual input device icon in the desired location using the Move function,
 ii) Physically lengthen or shorten the acutal input device,
 iii) Return the input device to its normal length.

Figure 8A:
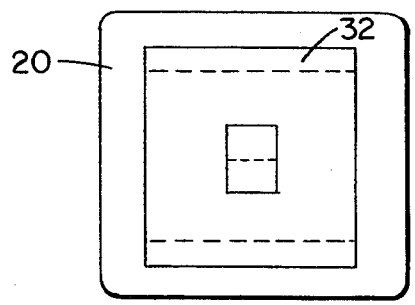
FIGS. 8A and 8B show the different directions of stretching with different orientations of the input device icon.
Figure 8B:
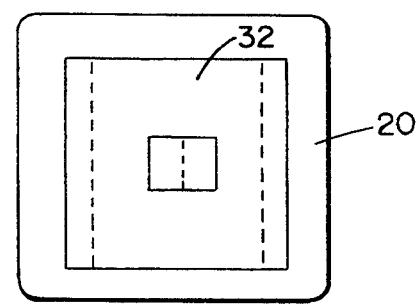

The system allows part planes to be compressed or expanded in only one direction at a time. Thus, the position of the virtual input device icon 26 is crucial. The icon 26 stretches and shrinks the part along the axis perpendicular to its bend axis. The lengthening or shortening of the input device 10 corresponds, respectively, to pressing the two halves 12, 14 of the device 10 together toward the hinge section 16, or pulling the two halves 12, 14 apart. Once the virtual input device 26 is positioned in the desired location, lengthening or shortening the physical input device 10 initiates the stretching or shrinking function. This direction of stretching or shrinking is demonstrated by FIGS. 8A and 8B, the dotted lines on the displayed part 32 showing boundaries of the part prior to stretching.

During a stretch or shrink operation the system performs automatic interference checking to the prevent a user from stretching or shrinking the material beyond a certain limit. This feature guarantees that only physically realizable parts are designed. In addition, a ghost image of the previous geometry remains on the screen to inform the user of the changes made. Finally, a pop-up window showing the stretch/shrink displacement appears in the lower right hand corner of the screen. Displacements are given relative to the initial geometry of the virtual sheet metal piece.

To terminate a stretch or shrink operation, the user need only return the input to its original length.

Lock Function

The Lock feature enables the designer to view the virtual metal part from any orientation. This function uses a mapping scheme similar to the one used in the Move function. However, three dimensional translations and rotations of the actual input device are mapped to three dimensional translations and rotations of the entire virtual sheet metal part.

The Lock button 23 itself is a latching push-button. To enter this mode, users need only press the Lock button 23 once. The system will stay in Lock mode until the button 23 is pressed again. During the lock operation, the icon 26 is shown in a fixed location on the part. If the user positions the part in an orientation which would hide the icon 26, the icon is shown on the nearest visible plane.

Undo Function

The undo feature allows the designer to sequentially "undo" design operations performed previously. To execute this function a user will simply press the undo button 25 once, then release it. Successive pressings of this button 25 cause progressively earlier design operations to be undone.

Menu and System Mode Operation

In the following sub-sections, a detailed description of the menu functions and system level commands is given. In general, the system is responsive to a number of different user inputs. The response of the system to these inputs is defined by the software program listed in the microfiche appendix.

System level commands allow users to view design function defaults and interact with the operating system to save and retrieve files. These commands are accessed by entries on the system keyboard 22.

Design Menu Functions

As with the design functions, there is a similar operational protocol for executing the design menu functions. With three exceptions, each design function has a corresponding menu function that is accessed by pressing the desired design button in the appropriate manner. The three exceptions are the Stretch, Shrink and Undo functions. These functions do not require menu functions because the system defines all of the relevant parameters.

To access a specific design function menu, a user "double-clicks" the desired design button and holds it down. In the case of the Punch and Cut/Emboss functions a "triple-click" is required as a "double-click" will access the design functions themselves.

Figure 9:
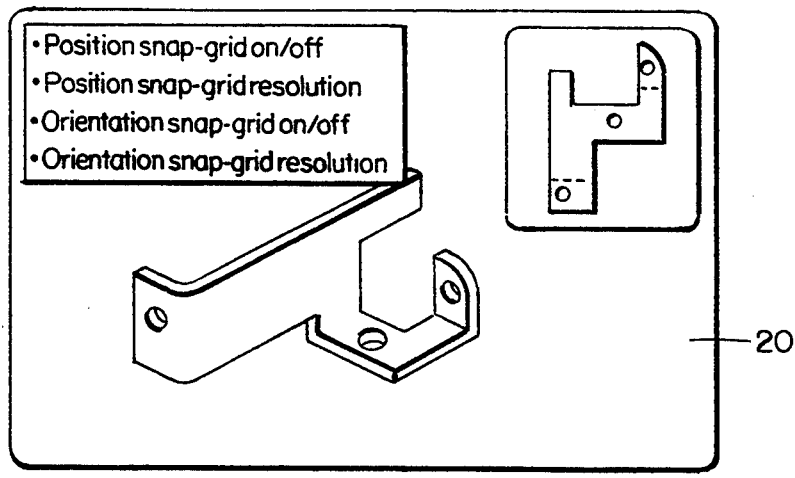
FIG. 9 shows a display screen with a pop-up menu diplayed over an object under design.

Subsequent to "clicking" the desired design button, a pop-up menu appears in the upper left corner of the screen 20. This menu presents the user with several different function options, depending upon which design function menu has been accessed. For example, FIG. 9 depicts the choices presented to the user in the Move menu. Different menu options are highlighted by moving the input device 10 back and forth in three-space and options are selected by releasing the design button when the desired menu function is highlighted.

Some of the menu functions are toggle switches (Move Snap-grid On/Off), and others are hierarchical menus that contain sub-menus. Returning to the Move menu example, a second menu appears when the "Snap-grid Resolution" option is highlighted. This second menu offers the user several numerical values from which to choose. Once a menu selection is made, the change is implemented in the data base and the user is returned to Design mode. The following table summarizes the menu options presented to the designer for each of design functions.

TABLE 1

MOVE

TABLE 1-continued

Position snap-grid on/off
Position snap-grid resolution
Orientation snap-grid on/off
Orientation snap-grid resolution
BEND
Bend angle snap-grid on/off
Bend angle snap-grid resolution
Select metal type
Select metal thickness
Select bend radius
CUT
Cut snap-grid on/off
Cut snap-grid resolution
PUNCH
Punch snap-grid on/off
Punch snap-grid resolution
LOCK
Position snap-grid on/off
Position snap-grid resolution
Wire-frame/Solid display
2-D unfolded view on/off
Orthographic views on/off Two groups of Menu functions are of particular interest. First, the Bend Menu allows users to alter the following virtual material parameters: Metal Type; Metal Thickness, and; Minimum Bend Radius. Each of these options is a hierarchical menu.

The "Metal Type" option enables a user to select the desired metal type from a given list. On the list are such metals as steel (various grades), aluminum (various grades), tin, copper, brass and bronze. The "Metal Thickness" option allows users to select the desired sheet metal thickness from a a standard thickness list provided by the system. Finally, the "Bend Radius" option allows designers to select the default bend radius for the entire sheet from a given list. The system calculates the minimum allowable bend radius and forces the user's selection to be greater.

The Lock Menu allows users to alter the system's default window contents with the "Wireframe/Surface" and "Unfolded View On/Off" functions. Both of these menu options are toggle switches and thus do not contain sub-menu options.

System Level Commands

System level commands are executed from the keyboard. They enable the designer to interact with the operating system and view the default design function parameters. The following are the system level commands available to the user:
SAVE FILE
LOAD NEW SHEET METAL PIECE
LOAD EXISTING FILE
VIEW DESIGN FUNCTION DEFAULTS
The "View Design Function Defaults" function is of special interest as it allows users to view all the current setting for all the different design functions. Information such as the bend angle snap-grid resolution, the sheet metal bend radius and the move snap-grid resolution can be viewed in an instant. The "Save File" and "Load Existing File" functions allow the storage and retrieval of partially designed parts. The "Load New Sheet Metal Piece" function allows the start of a new design job with the loading of an unaltered sheet metal piece.

SYSTEM HARDWARE

The computer aided design system of the present invention has four main hardware components: a computer 9, the tactile-spatial input device 10, the Polhemus spatial sensor, and a Data Translation interface board 34. The relationships between these components are demonstrated by the schematic diagram of FIG. 10.

In the preferred embodiment, the computer 9 is a Sun 4-330 SPARC Workstation. This is a 32-bit RISC based computer and is equipped with a CXP hardware graphics accelerator using an 8-bit frame buffer. Inputs are delivered to the computer 9 through a Data Translation Interface Board 34. This VMEbus board is equipped with a 12-bit analog to digital converter that can perform conversions at a maximum rate of 25 kHz. Sixteen single-ended analog inputs are accepted over a fixed 10 volt range from negative to positive five volts. In addition to these inputs, the board can read or write 2 bytes of digital information. The input device 10 relays both digital and analog data to the computer 9 through this board.

Figure 10:
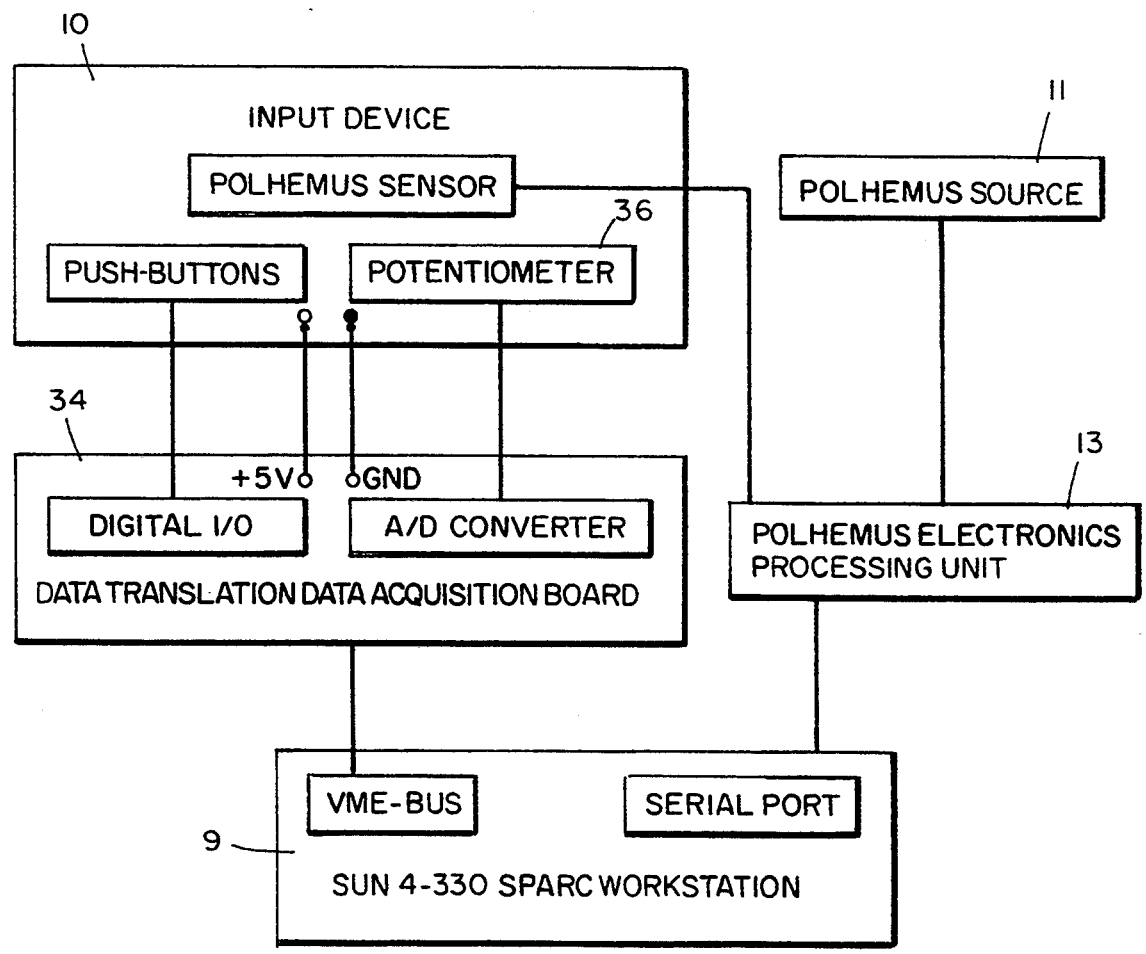
FIG. 10 illustrates the connections between different components of the CAD system of FIG. 1.

As shown in FIG. 10, tactile information from the input device 10 is transmitted to the board via two types of sensors: eight normally-open, momentary push-button switches, and one potentiometer. The push-buttons provide information about each design function while the potentiometer 36 provides information specific to the Bend function. These sensors are externally powered by a regulated 5 volt direct current power supply. Since the potentiometer's analog input range is only half that of the A/D converter, the effective converter resolution is halved. However, 6-bit resolution suffices for this application since the potentiometer 36 is rotated through a maximum angle of only 200 degrees.

Spatial information from the input device 10 is relayed to the computer 9 by the Polhemus 3Space Isotrak Sensor System. This system is a 6 degree of freedom device that uses low frequency magnetic waves emitted from a source, to determine the 3-D position and orientation of a sensor relative to that source or any other coordinate system.

The sensor 45 is mounted discreetly inside the body of the input device 10. Both the source 11 and the sensor 45 transmit information to the Electronic Processing Unit 13 which computes the 3-D information. This unit relays relevant data to the Sun computer using the serial port configured for RS232C conventions. The baud rate of the data transfer is 19,200.

Input Device Hardware

There are three main structural components to the input device 10: two body pieces 12, 14 and a hinge assembly 16. The body pieces 12, 14 house the momentary push-button switches that allow users to select and perform desired design operations. The hinge assembly 16 connects the two body halves and allows their relative motion. The input device 10 has two degrees of freedom. The body sections 12, 14 may be translated and rotated with respect to one another. These degrees of freedom allow users to physically deform the device 10 through manual manipulation, to provide the system with desired tactile and spatial information.

Figure 11:
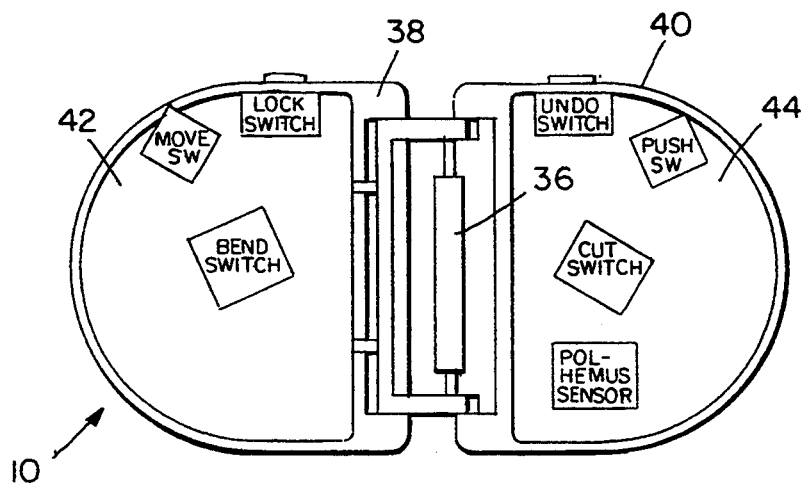
FIG. 11 shows a cross section of the input device labelled with the locations of the internal components of the device.

Each body half of the input device 10 has a housing 38, 40, and a circuit board 42, 44. In the preferred embodiment, each housing 38, 40 is machined from a solid piece of 0.75 inch thick black Delrin stock (Delrin is an acetal copolymer manufactured by the E. I. Dupont Company). The Delrin material provides the structural rigidity necessary for proper operation of the device 10. Each half of the input device 10 has a circuit board 42, 44, as shown in FIG. 11. The location of the components of each circuit board 42, 44 are labelled in FIG. 11, including the location of the Polhemus sensor 45. The circuit boards 42, 44 are mounted inside the housing hollows. Each board rests squarely on a shelf protruding out from the inner walls of each body piece. Rectangular pockets are machined in the face and side of each housing to allow the push-button caps to remain flush with the housing faces. Backplates of the housings 38, 40, also black Delrin, serve to clamp each circuit board rigidly to its housing and protect the internal circuitry.

The hinge assembly 16 is aluminum in the preferred embodiment, and is comprised of two main sections. These two sections are connected by potentiometer 36 housed and covered by the right-hand section of the hinge assembly 16. The resistance value of the potentiometer changes with relative angular displacement between the sections. Two bearing surfaces enable this relative rotational motion the potentiometer shaft 46 on one side and a 10–32 UNF shoulder screw on the other. The exposed length of the potentiometer shaft 46 is supported in two places in order to prevent radial and axial loads from being carried by the potentiometer bushing.

The Stretch and Shrink functions are enabled by the relative motion between the body halves. Thus, an expansion of the input device 10 results in an expansion of the virtual part, or object under design. Similarly, a compression of the input device 10 results in a compression of the object under design. The right-hand portion of the hinge assembly 16 is mounted rigidly to the right circuit board 44 which is in turn clamped to rigidly to the right body housing 40 by a backplate, so that no relative motion between the right body half 14 and the right hinge is permitted. However, the left body half 12 may be translated relative to the left-hand hinge section. This translation is accomplished by sliding the left body half 12 on the two bearing shafts 48 which protrude from the left hinge section.

Figures 12A, 12B:
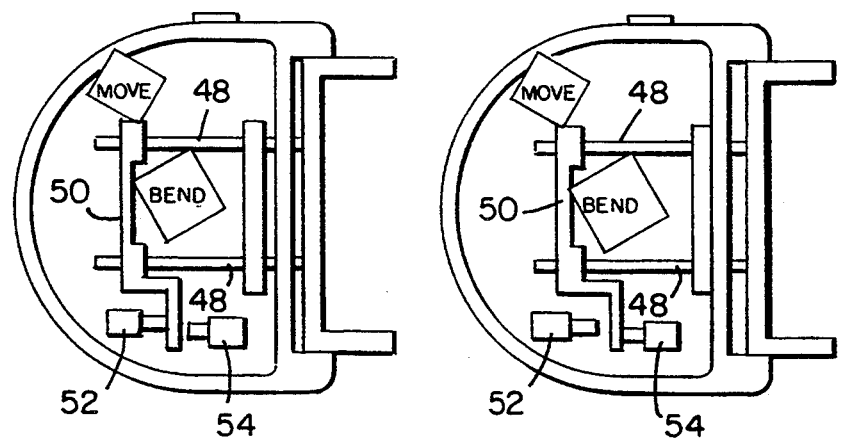
FIGS. 12A and 12B show a cross section of the input device with two different positions of relative translation between two halves of the input device.

FIG. 12A shows a cross sectional view of the left half 12 of the input device 10. The cross-bar 50 mounted rigidly between the two bearing shafts enables/disables the Stretch and Shrink functions, and provides structural support to these shafts. The Stretch and Shrink functions are actuated by two momentary switches 52, 54. During a stretching operation, the left body half 12 is translated to the left until the lower portion of the cross-bar physically contacts a expansion switch 52 (FIG. 12A). Similarly, during a shrink operation, the body is translated to the right until the corresponding compression switch 54 is engaged (FIG. 12B). As long as these momentary switches are engaged, the virtual part is stretched or shrunk. During normal operation, the left body half 12 is held between the two switches by a detent in one of the bearing shafts. This detent ensures that only desired enlargements and reductions of the sheet metal piece are made.

Electrical Configuration

Figure 13:
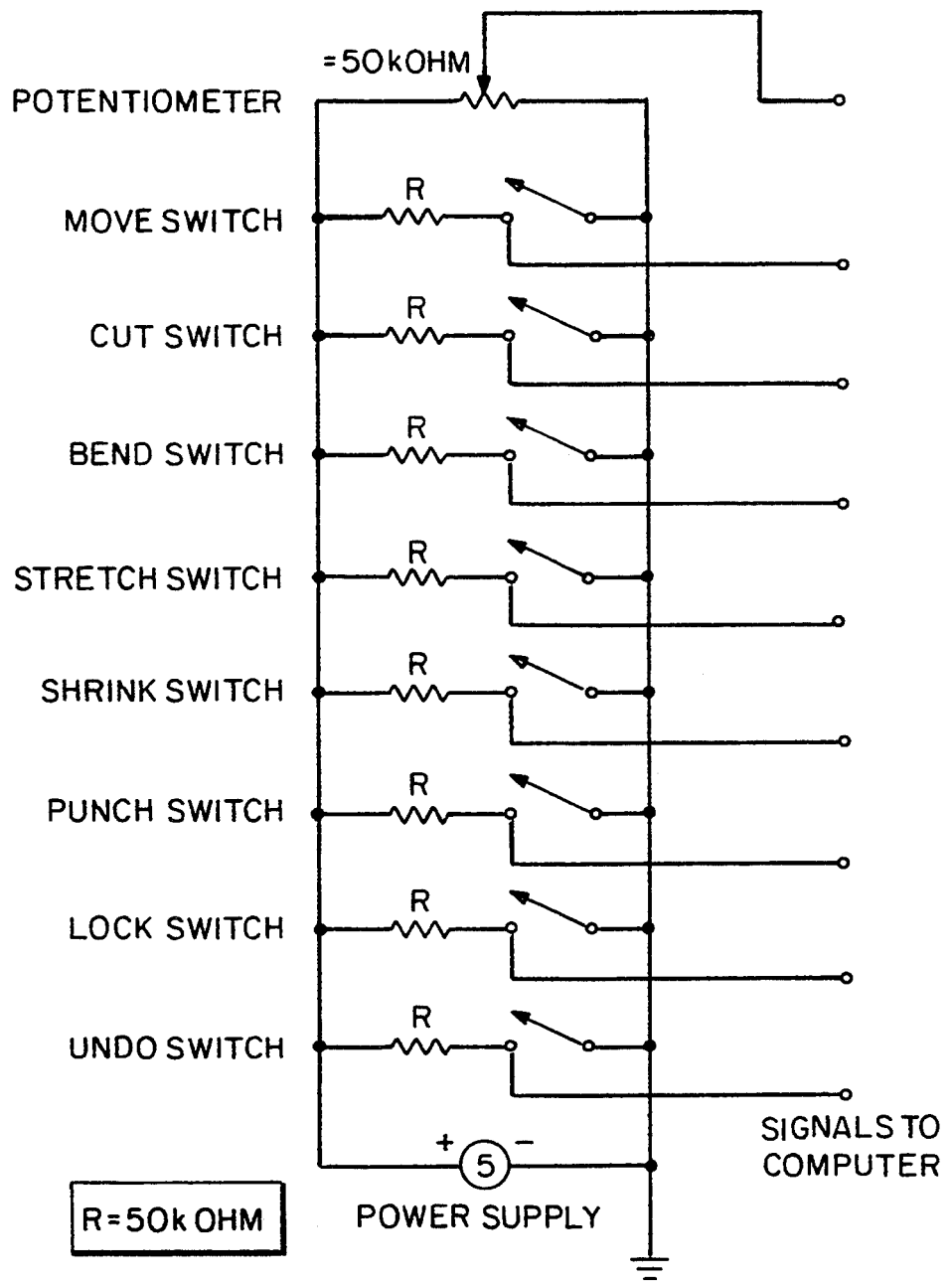
FIG. 13 is a schematic of the input device of the CAD system of FIG. 1.

An electrical schematic of the input device is provided in FIG. 13. The 50 kΩ hinge potentiometer 36 and eight momentary pushbutton switches are powered externally by a regulated five volt, direct current power supply. The power supply and ground connections are supplied to the input device from the Data Translation Data Acquisition board 34. Each switch is mounted in series with a 50 kΩ resistor, which limits the current flow to the Data Translation board 34. All the switches are mounted in parallel, as shown in the figure. Signals are carried to and from the input device by a miniature multi-conductor cable measuring roughly 0.15 inches in diameter. Each of the eleven conductors in the cable is insulated with Teflon ®, a registered trademark of the E. I. Dupont Corp.

In the preferred embodiment, the input device 10 is made to emulate a piece of sheet metal. Thus, it is flat, thin and smooth. In order to accommodate many different hand sizes, the device is made symmetric and "pill-shaped." The curved ends and rounded edges allow it to rest comfortably in the hands of many users. In addition, the input device 10 is made to be held in any arbitrary manner. There are no contour handles or grips that force designers to hold the device in a specified position. Thus, there is no right or wrong way to hold the device 10. Users may hold it in any manner that is comfortable.

All of the buttons on the input device produce an audible "click" when pressed, so that a user knows unambiguously when they have entered a given design function. The "active" design function buttons are arranged in a radial pattern on the input device. The Move function button 15 has also been placed on the face since it is usually used with great regularity. Experimentation with the device has demonstrated that this radial configuration allows easy access to all the functions, regardless of hand size. The remaining design function buttons 23, 25 (Lock and Undo) are located along the top edge of the input device 10 because these functions are conceptually different than other active design functions, and are intended to support and modify the active design functions.

In the preferred embodiment, the input device 10 measures 3.5 inches high, 0.75 inches thick, and 7.25 inches long, nominally. Assembled, it weighs roughly 10 ounces. Thus, its size and weight allow a wide range of users to hold the input device 10 for long periods of time without experiencing stress or muscle fatigue.

SOFTWARE DATA STRUCTURES

The microfiche appendix has a program listing for controlling the functions of the CAD system. The program as listed in this appendix implements a working working three-dimensional CAD system for use with the tactile input device 10. However, the software code for some of the foregoing functions, such as the Punch and Emboss functions is not included in the program listing of the microfiche appendix. The conceptualization of these functions is described in detail, but is not yet in the form of a working computer program.

The present invention uses a data structure based on the "Winged-edge" data structure discussed by Baumgart in "Geometric Modelling for Computer Vision, PhD thesis, Stanford University, 1974. With this model, part data is stored in a hierarchical manner, and 3-D points in space define vertices. Two vertices define an edge, and a minimum of three edges define a face. The centerpiece of the data structure is the Edge List. This list stores information which relates the edges and faces to one another. The data structure is traversed by sequentially stepping through a Face List and retrieving information about each face from the Edge List.

FIG. 14A depicts a simple part having eight vertices, ten edges and three faces. This part has no thickness. Face number 0 is defined beginning at edge number 0. This edge is defined by vertices 0 and 1, as shown. As the data is defined in a right-hand coordinate system, the positive face for edge 0 is face number 0. There is no negative face because there is no face to the right of the edge. The next positive edge and previous positive edge are edge 1 and edge 3, respectively, because the face is traversed in a counter clock-wise direction. Face 0 is completely defined when the next positive edge value points to the first edge value in the Face List (FIG. 14B).

Edge 1 has both a positive and a negative face faces 0 and 1, respectively. Since both of these faces are traversed in a counter-clockwise direction, the previous positive edge and previous negative edge for edge 1 are 0 and 5, respectively. Similarly, the next positive edge and next negative edge are 2 and 4, respectively.

The present data model differs from the traditional Winged-edge structure in several important ways. First, 3-D and 2-D point data is stored in a Vertex list. Inclusion of the 2-D data allow the unfolded view of the part to be displated quickly and efficiently at any given time. Second, two types of edges are defined in the Edge List—lines and arcs (FIG. 14C). A center point is included for those edge types defined as arcs. Third, two types of the faces are defined in the Face List—planes and bends. The latter face type is used to approximate a bend radius. The Face List also stores an identification number for each face. This number allows the faces to be accessed and modified individually. In addition to the identification number, other face attributes such as the color and the number of points on the face are stored. Finally, a "processed_flag" value is stored in each of the three lists. This flag is used by the design functions to temporary mark a given vertex, edge or face for future computation.

Programming of the CAD system uses the Programmers Hierarchical Interactive Graphics System (PHIGS), as implemented for a Sun computer system (i.e. SunPHIGS). SunPHIGS provides a structured graphics programming environment optimized for real-time interactive graphics application. The programs use the "C" programming language.

The main structural component of the PHIGS environment is the Central Structure Store (CSS). This structure is comprised of "elements", each of which has a specific set of "attributes." These elements are graphics functions that perform setup operations such as defining the viewing parameters, colors, linestyles and linewidths, and drawing operations such as drawing 3-D lines or solid polygons to the screen. Attributes are arguments to the element functions. The CSS is a collection of an arbitrary number of elements, arranged in a specified manner. When executed, an element pointer sequentially steps through the CSS executing all of the functions individually. Executing the structure enables the desired graphical image to be drawn on the screen. To update a graphics image, the CSS must be modified by rearranging, adding or deleting elements, and re-executed.

PHIGS allows for many structures to be created and named. For example, our system has three structures: one for the sheet metal part, one for the virtual input device, and one for the cut-lines which are drawn during the cut operation. These three structures allow the three entities to be modified and drawn independently. PHIGS is also equipped with its own internal data structure representing three dimensional part information. This data structure allows the graphics hardware system to display 3-D graphical images at the fastest possible rate. Subsequent to every modification of the virtual sheet metal piece, the Winged-edge data structure is mapped to the PHIGS data structure for display.

SOFTWARE FUNCTIONS

Figure 15:
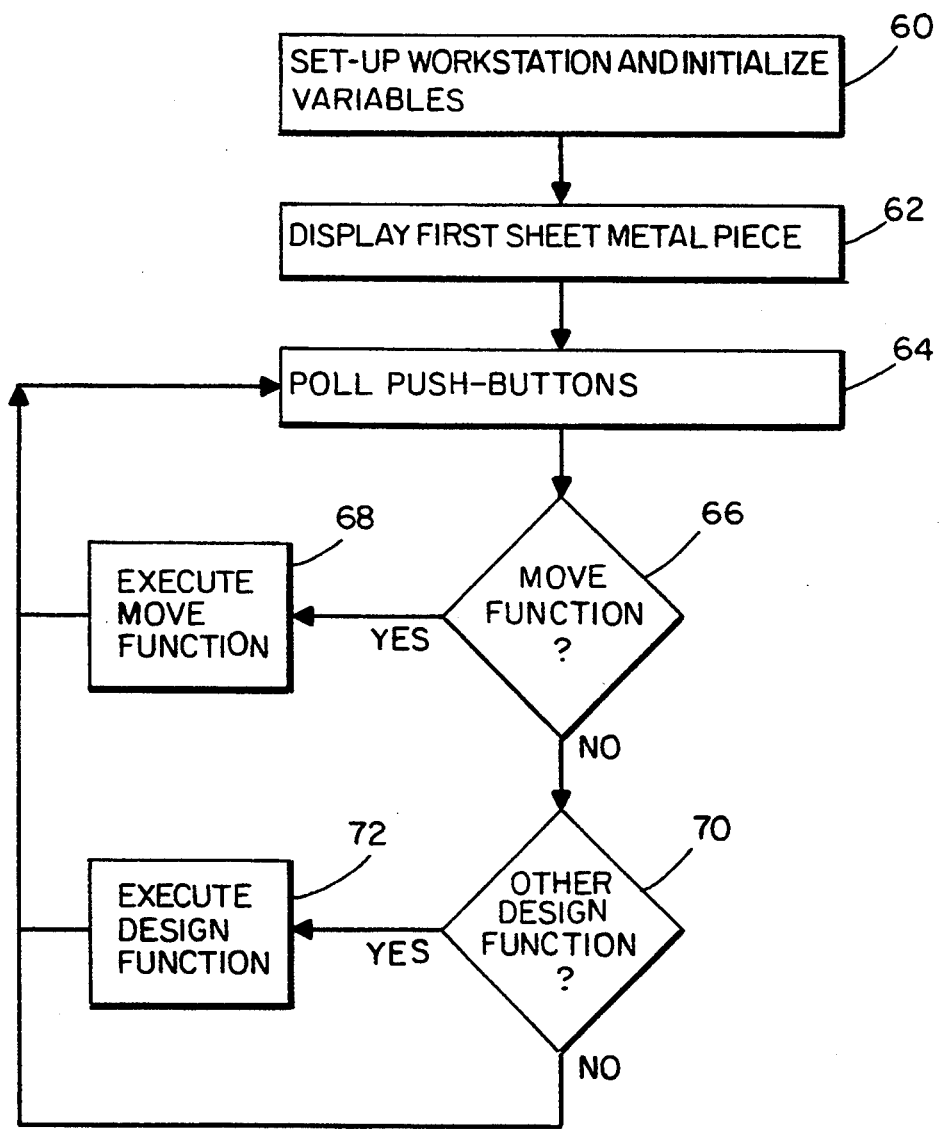
FIG. 15 is a main program level flowchart for the CAD system of FIG. 1.

A schematic diagram of the main looping function is shown in FIG. 15. After defining the workstation setup, initializing the variables (block 60) and displaying the initial piece of virtual sheet metal (block 62), the main loop polls the eight momentary switches to determine the current design mode (block 64). The system determines whether the function is a Move function (block 66), and if it is, the Move function is executed (block 68) and the polling continues. If a different design function is identified (block 70), that design function is executed (block 72) and polling continues.

Figure 16:
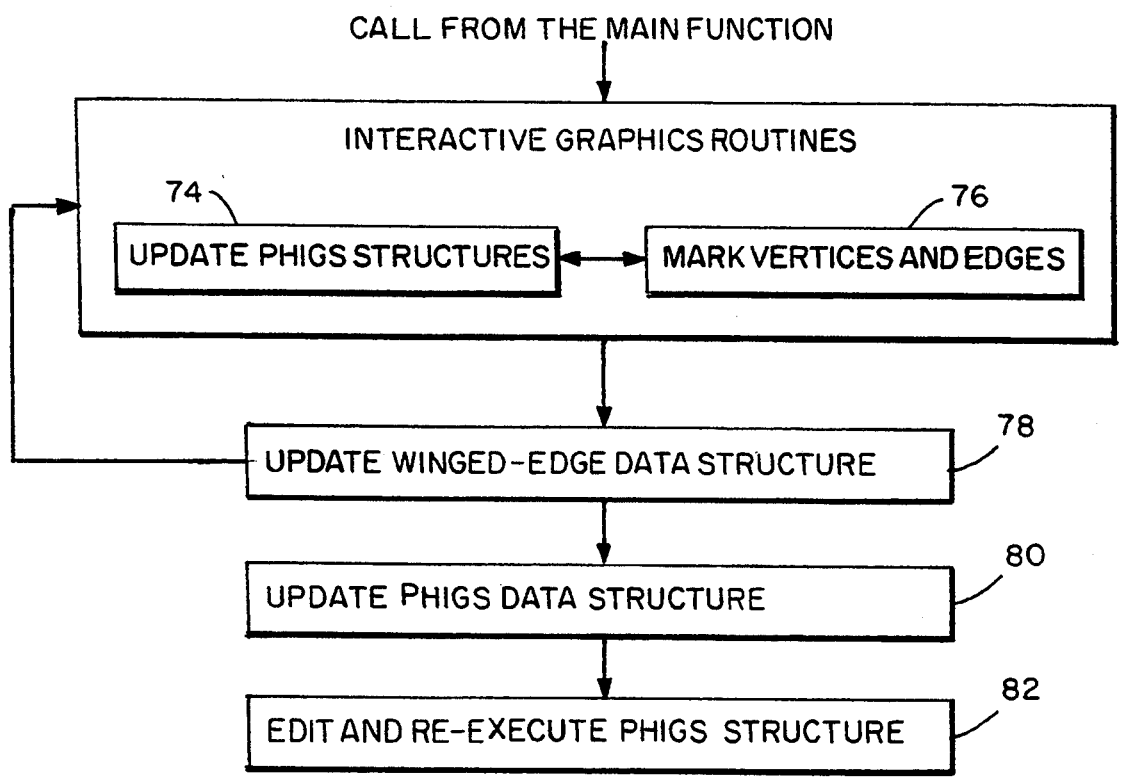
FIG. 16 is a subroutine flowchart for a design function called from the main program.

All of the active design functions have a similar program structure, demonstrated, in general, by FIG. 16. The interactive graphics routines first update the display in real time by modifying and re-executing the appropriate structures (block 74), then mark specified vertices (block 76), edges and faces for future computation. Once the final part geometry has been specified by the designer, the Winged-edge and PHIGS data bases are updated (blocks 78, 80), and the PHIGS structure re-executed (block 82).

Figure 17:
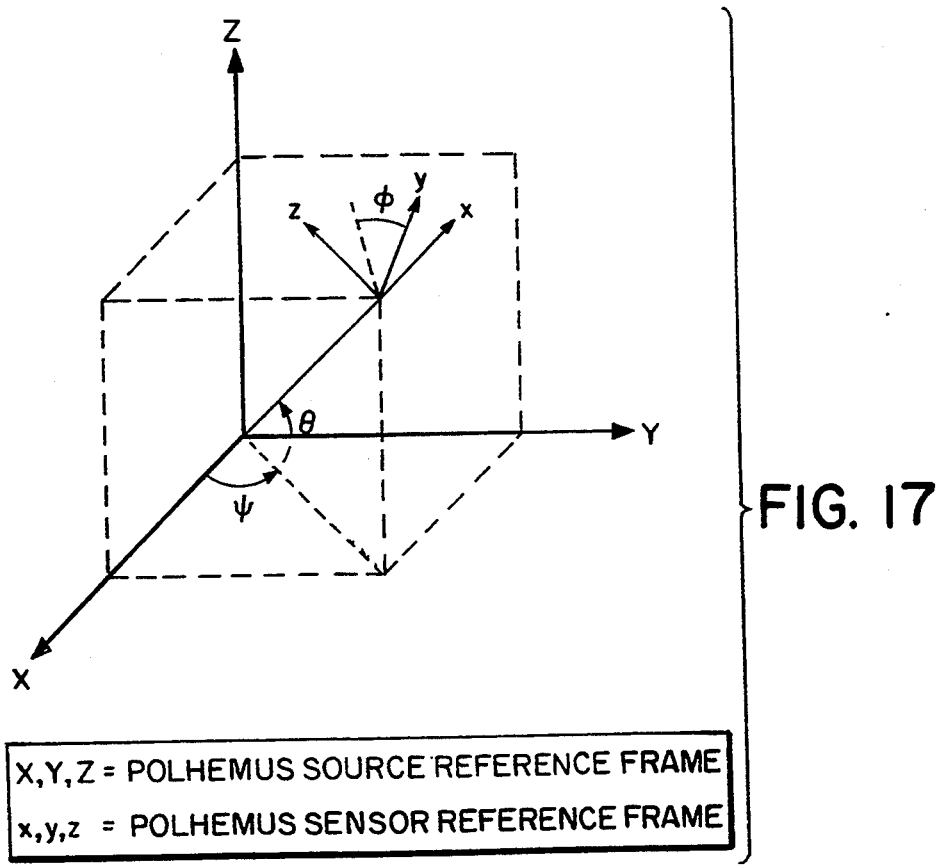
FIG. 17 shows the different relative orientations of reference frames of the CAD system of the present invention.

There are three coordinate systems associated with the present invention with regard to the reference frames of the world, the Polhemus source 11, and the Polhemus sensor 45. The origin of the world reference frame is located in the middle of the display screen 20. This frame is fixed in space at all times. Aligned with the world reference frame is the coordinate system of the Polhemus source 11, which is also fixed in space. The virtual sheet metal part is defined in the world coordinate system. Since the Polhemus sensor unit 45 is mounted rigidly in the input device 10, its reference frame is free to move in 3-space. The sensor 45 is mounted such that when the input device 10 is held vertically, the sensor's coordinate system aligns with that of the source 11. Position and orientation information relating the sensor's reference frame to the source's reference frame is provided by the Polhemus Electronic Processing Unit 13. This information is stored in the form of a 1×6 vector as demonstrated below:

$$\begin{bmatrix} x_{sensor} \\ y_{sensor} \\ z_{sensor} \\ \psi \\ \Theta \\ \Phi \end{bmatrix}$$

where $x_{sensor}$, $y_{sensor}$, and $z_{sensor}$ are translation along the three principle axes and $\psi$, $\Theta$ and $\Phi$ are the azimuth, elevation and roll angles, respectively, that define the orientation of the sensor 45 with respect to the source 11. The relationship of these variables is demonstrated in FIG. 17. Azimuth is defined as the rotation of the x and y coordinates about the Z-axis. Elevation is the rotation of the rotated z coordinate and the x coordinate about the rotated y-axis. Roll is defined as a rotation of the rotated x and z coordinates about the x-axis. The above translation and rotation values are used to created the transformation matrices necessary to relate the input device 10 to the virtual sheet metal part (Lock) and virtual input device (Move).

Move Function

This function maps 3-D movements of the input device 10 to 3-D movements of the virtual input device 26 on the planes of the virtual sheet metal part. This mapping occurs in two distinct phases. The first phase maps the 3-D position and orientation of the input device 10 in space to the 2-D position and orientation of a single unit vector in the X-Y plane of the world coordinate system. This unit vector is not actually displayed on the screen. Rather, it is a means of keeping track of the information gathered from the Polhemus sensor 45. The actual 3-D information used to display the virtual input device 26 is calculated in the second phase of the mapping. This three dimensional information is used to update the appropriate PHIGS structure and display the input device icon in the correct position and orientation.

The first mapping function maps the 1×6 vector provided by the Polhemus to the 1×3 vector show below, $$\begin{bmatrix} x_{unit\_vector} \\ y_{unit\_vector} \\ \alpha_{unit\_vector} \end{bmatrix}$$

where $x_{unit\_vector}$, $y_{unit\_vector}$ is the position of the unit vector on the screen and $\alpha_{unit\_vector}$ is its orientation in the X-Y plane. These coordinates are given with respect to the world coordinate system.

The translation mapping between the input device 10 and the vector's position is given by $$x_{unit\_vector} = K_1(\Delta x_{sensor})$$

$$y_{unit\_vector} = K_1(\Delta x_{sensor} + \Delta z_{sensor})$$

where $\Delta x_{sensor}$ and $\Delta y_{sensor}$ and $\Delta z_{sensor}$ are the displacements of the sensor relative to its previous position in space, and $K_1$ and $K_2$ are scaling factors which have both been set to 4. The Polhemus sensor's displacements are given with respect to the source's coordinate system. With this mapping scheme, the incremental movements, not the absolute position of the input device 10, determine the virtual input device's final position. In addition, both vertical and horizontal movements of the input device 10 cause vertical movements of the virtual input device 26 on the screen. This translation mapping has been found to be intuitive for most users.

The mapping function relating the input device 10 to the orientation of the unit vector, is itself a function of the input device's orientation in 3-space. Functionally, rotations of the input device about the sensor's z-axis need to be mapped to rotations of the unit vector about the world's Z-axis ($\alpha_{unit\_vector}$) regardless of the input device's orientation in space. Such a mapping will enable the designer to use the input device 10 in either the X-Y or the X-Z plane. When the input device 10 is held vertically in the X-Y plane, rotations of the device 10 about the source's z-axis map is aligned with the source's Z-axis. However, when the input device 10 is held horizontally in the X-Z plane, the sensor's z-axis is aligned with the source's Y-axis. In order to obtain the desired angular displacement information, the x and y axes of the sensor must be transformed back to align with the source's before absolute rotations about the sensor's z-axis can be mapped correctly to the $\alpha_{unit\_vector}$ value.

The second phase of the Move mapping function maps the 2-D position and orientation of the unit vector to the 3-D position and orientation of the virtual input device on a specified place of the sheet metal part. This is, it maps the 1×3 vector of screen coordinates to the 1×4 vector provided below:

$$\begin{bmatrix} x_{icon} \\ y_{icon} \\ z_{icon} \\ \alpha_{icon} \end{bmatrix}$$

where $x_{icon}$, $y_{icon}$ and $z_{incon}$ is the location of the virtual input device and $\alpha_{icon}$ is its orientation on the specified part plane.

The system determines the part plane on which to draw the icon 26 by using the PHIGS Incremental Spatial Search function (PISS). This function takes a 2-D screen coordinate and returns the identification number of the object drawn at those coordinates. Since the identification numbers for each virtual part plane have been stored in the Face list of the Winged-Edge data structure, the position of the unit vector may be mapped to a specific sheet metal plane. Once the part plane is known, the position of the virtual input device on the plane is determined by the intersection of that plane and an imaginary line drawn parallel to the Z-axis passing through the point ($x_{icon}$, $y_{icon}$). Finally, the orientation of the virtual input device icon 26 on the specified part plane is given by:

$$\alpha_{icon} = (\alpha_{unit\_vector}) - (\text{correction factor})$$

This correction factor is necessary in order to maintain the angular correspondence between the input device 10 and its icon 26. That is, when the input device 10 is held vertically, the virtual input device 26 is displayed vertically, regardless of the orientation of the sheet metal piece.

The above four 3-D coordinate values define the actual position and orientation of the input device icon 26 in the world coordinate system and thus, establish a link between the input device's position in space and the icon's position on the virtual sheet metal part. These four values are stored for use by the other design functions.

Bend Function

Figure 18:
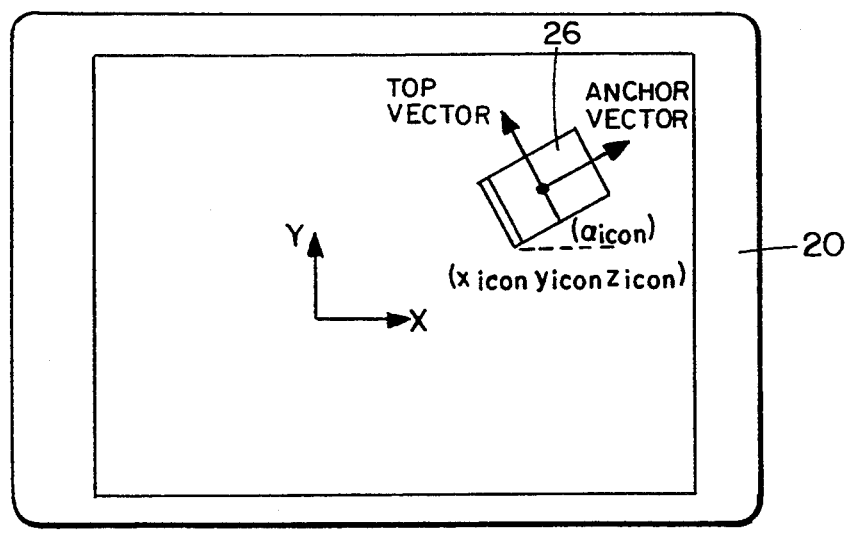
FIG. 18 is an illustration of the identifying vectors of the input device icon.

This function allows bends to be placed in the virtual sheet metal piece. When called from the main looping function, Bend is passed the 3-D position and orientation of the virtual input device 26 on a given virtual part plane, i e., $x_{icon}$, $y_{icon}$, $z_{icon}$ and $\alpha_{icon}$. As shown in FIG. 18, the virtual input device shape is defined by two orthogonal unit vectors: a Top vector and an Anchor vector. Although these vectors are not actually displayed, they are particularly useful in computation. The Top vector defines the center-line of the virtual input device—the line around which all bends will occur. The Anchor vector points away from the anchored side of the virtual input device 26. During a bending operation, the non-anchored side of the icon 26 will always be rotated with respect to the anchored side, which will remain fixed on the screen.

Bending of the given sheet metal face occurs in the four main stages outlined below:

i) Determination of the bend axis,
ii) Marking of the vertices to be rotated during the bend,
iii) Division of the specified face into new vertices, edges and faces, and
iv) Bending of the sheet.

The bend axis is defined simply by the Top vector of the virtual input device 26. Points A and B are the intersections of the bend axis with the plane edges. Once the bend is defined, all of the vertices on the non-anchored side of the input device icon 26 must be marked for bending. Only these marked vertices are rotated on the screen 20.

The actual marking procedure involves first creating a series of vectors, each of which is defined by a line drawn from the icon's center to a vertex on the given plane. The icon's center is defined by the intersection of the Top and Anchor vectors. Once created, the dot product of each vector is taken with the Anchor vector. If this Dot product is greater than zero, the corresponding vertex is marked by setting the processed_flag in the Vertex list of the Winged-edge data structure. This process assures that only vertices on the non-anchored side of the input device icon 26 are marked.

Several checks are performed during this marking routine to ensure that desired bend is valid. For instance, the system will verify that points A and B lie on either an external edge or a cut in the part. If neither is true, the bend is declared invalid and the bend function is aborted. Such bends are not permitted because the system does not allow bend lines to intersect.

In addition, the system checks for sheet metal parts having adjacent planes on the non-anchored side of the input device icon 26. In such cases, the marking function will automatically mark the vertices on all of these planes by iteratively calling a special routine called mark_vertices. This routine steps through the Winged-Edge data structure setting the processed_flag for all of the vertices on a given face.

With the appropriate edges marked, the given face is divided into a bend face and a plane face. The bend face is used as an approximation to the bend radius. The bend face width is given by:

bend_width = (bend_angle)(bend_radius)

where bend_radius is the imaginary radius of the bend, and bend_angle is an angular value (in radians) being specified by the user. The bend_radius value is specified by the system. In total, six edges, four vertices and two faces are added to the modified Winged-Edge data structure. With the face divided and vertices marked, the sheet metal part is then bent.

Figure 19A:
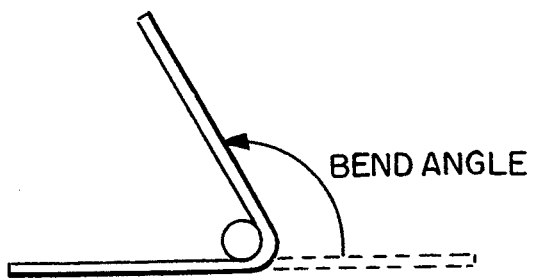
FIGS. 19A and 19B illustrate, respectively, the ideal bending of an object under design, and the corresponding approximation made by the present invention.

Conceptually, bending of the sheet metal part is accomplished by wrapping the virtual metal around an imaginary cylinder of a specified diameter, as demonstrated in FIG. 19A. However, since actual bend radii are not currently supported by our system, a two step transformation process has been implemented to approximate the material bending.

Figure 19B:
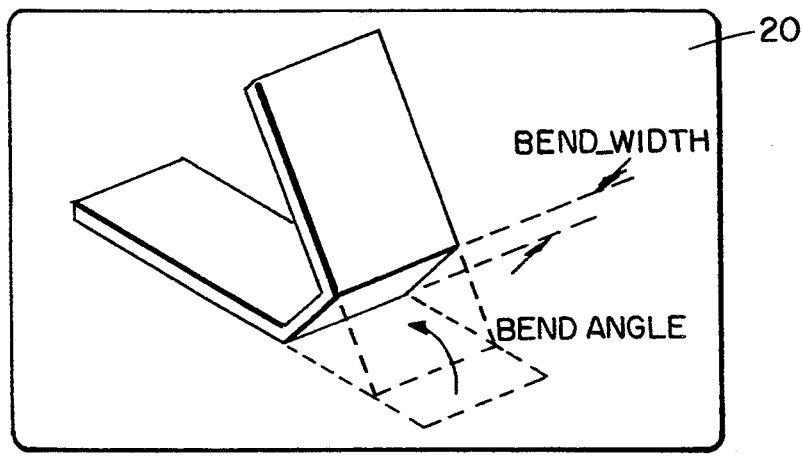

The virtual part is first transformed to align the bend axis with the Y-axis of the world coordinate system in order to simplify the subsequent transformations of the marked vertices. Each marked vertix is then multiplied by a transformation matrix which rotates that vertex to a new position based on the bend angle specified by the user. This transformation matrix is actually the concatenation of three transformation matrices—a translation towards the Y-axis, a pure rotation about that axis, and finally, a translation away from the axis to a new position in space. These three transformations simulate the wrapping of virtual material around an imaginary cylinder. The transformation of each marked vertex cannot be performed by a simple rotation about the bend axis because the bend face must be rotated through only half the angle specified by the user. The result is the approximation demonstrated by FIG. 19B.

Cut Function

This function allows users to place cuts in the planes of the virtual sheet metal piece.

The Cut function is divided into thee separate routines, each of which executes a different stage of the actual cutting operation. These three stages are outlined below:

i) Determination of cut line,
ii) Determination of cut type and modification of the cut line and data base,
iii) Cutting of the part and removing severed material.

The first function, called top_cut, enables users to specify endpoints of the desired cut-line anywhere on the external edges of a given sheet metal part plane. When called from the main loop, top_cut is passed the 3-D position and orientation of the virtual input device on a given virtual part plane, i e., $x_{icon}$, $y_{icon}$, $z_{icon}$ and $a_{icon}$. This 3-D position information is stored as the first cut endpoint in a temporary variable. To specify the second cut endpoint, the user is automatically placed in Move mode. When the virtual input device 26 has been poisitoned correctly, the cut button 19 is released, and the 3-D position of the icon 26 is stored as the second endpoint in another temporary variable. The heavy line connecting the two endpoints is drawn by simply modifying and re-executing the cut line's PHIGS structure. With the cut line specified, top_cut passes the endpoints to the second sub-routine.

Figure 20:
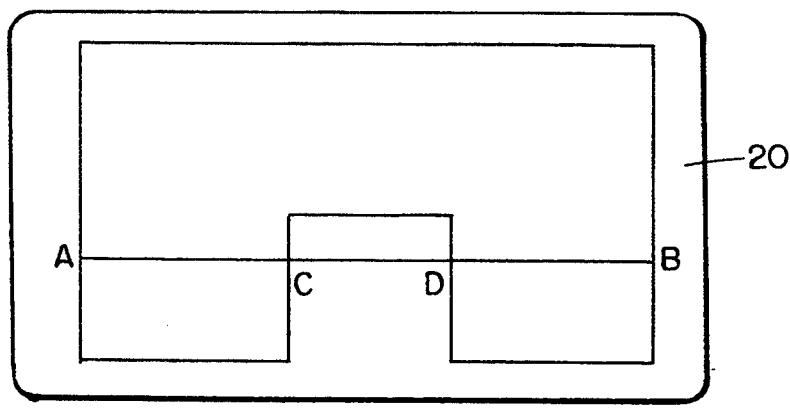
FIG. 20 shows a single cut function across two separate portions of an object under using the CAD system of FIG. 1.

The second sub-routine is divided into two main sections. The first section first determined the cut type based on the position of points A and B, then stores the cut type in a cut_type variable. The second section first checks for intersections of the specified cut-line with other cuts or part edges, then divides the cut line accordingly and marks certain edges for future computation. For example, FIG. 20 depicts a specified cut line (AB) which cuts across two external plane edged. In this case, the specified cut line is divided into three segments: AC; CD and; DB. This division would allow the cut lines inside the part to be distinguished from those outside.

Figure 21:
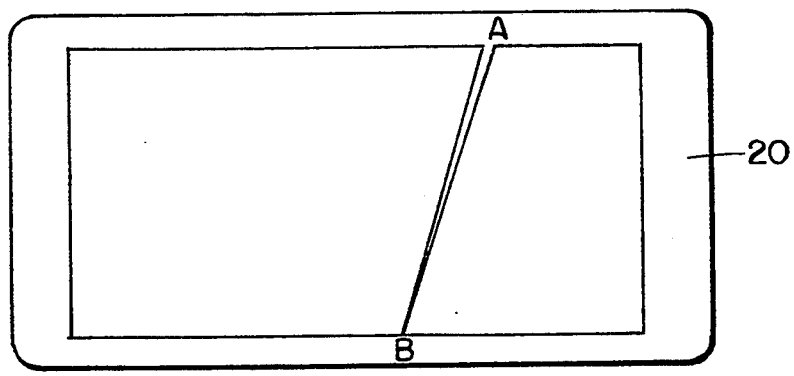
FIG. 21 illustrates the separated portions of an object under design during a cut function of the CAD system of FIG. 1.

With the new cut segments established, part edges which contain the endpoints of these segments are marked for future computation by setting the processed_flag in the Edge list of the Winged-Edge data structure. The proces for placing edge-to-edge cuts in the virtual material includes creating new vertices on marked edges, and shortening marked edges to implement the cut. In order to retain the physical integrity of the part, the cut line drawn between points A and B must be implemented with a given thickness. First, each marked edge is divided in two segments by adding points A and B to the Winged-Edge data structure as vertices of two newly created edges. These vertices are then translated a given, amall amount away from the cut line to represent the thickness of an imaginary cutting blade. Thus, once the edge-to-edge cut is fully implemented, two distinct and separate part planes result as shown in FIG. 21.

The planes are represented in the Winged-Edge data structure as two separate and distinct loops. The system is placed in Move mode to allow the user to select the plane which is to be retained. When the virtual input device icon 26 is positioned on the desired part plane, the user presses the Cut button 19. This switch closure triggers execution of the PHIGS Incremental Spatial Search (PISS) function which returns the identification number of the specified plane.. Conceptually, the undesired part plane is removed simply by traversing the entire data structure and removing the loop that does not contain the specified plane. The new sheet metal part is displayed by updating the PHIGS data, and modifying and re-executing the sheet's PHIGS structure.

Stretch and-Shrink Functions

These functions allow the designer to enlarge or reduce the size of specified portions of the virtual sheet metal piece. As with the bend function, when either the stretch or shrink function is called from the main looping function, it is passed the 3-D position and orientation of the virtual input device on a given virtual part plane, i e., $x_{icon}$, $y_{icon}$, $z_{icon}$ an $a_{icon}$.

Stretching or shrinking of a given virtual part plane is accomplished by continually adding a specified 3-D stretch or shrink_vector to particular vertices of the given face. Such an operation translates these specified vertices and increases or decreases the part's planar area. Stretching or shrinking of the given part face occurs in three major stages:

i) Determination of the stretch or shrink_vector,
ii) Marking of the vertices to be translated during the stretch or shrink,
iii) Translating the marked vertices.

The stretch and shrink_vectors are defined in the World coordinate system simply as a fraction of the icon's Anchor vector. That is, the vectors are given by:

stretch_vector=C$_1$(Anchor_vector)

shrink_vector=C$_2$(Anchor_vector)

where C$_1$ and C$_2$ are scaling factors set to 0.10 in the preferred embodiment. These vectors determine the direction in which the marked vertices will translate.

As with the bend function, only the vertices on the non-anchored side of the virtual input device need to be marked for translation. This marking procedure is identical to the one used during the bending operation.

The only functional difference between the Stretch and Shrink functions, aside from the direction of the stretch or shrink_vector, is the fact that during a shrinking operation, the system limits the travel of vertices. The system allows shrinking if and only if:

(A) (Anchor_vector)>0 and (B) (Anchor_vector)>0

This checking function serves only to prevent the designer from shrinking the part past the position of the virtual input device. The routine does not check the interference of the virtual part planes. No true reference checking is conducted during either the stretch or shrink operation.

Lock Function

The Lock function allows designers to view the virtual sheet metal part from any orientation. Three dimensional information provided by the Polhemus sensor is used to build a transformation matrix which transforms every point in the data base incrementally from its old position and orientation, to its new. A general form of this transformation matrix is shown below:

$$\begin{bmatrix} \cos\phi\cos\theta & \cos\phi\sin\theta\sin\psi - \sin\theta\cos\psi & \cos\phi\sin\theta\cos\psi + \sin\phi\sin\psi & X_{trans} \\ \sin\phi\cos\theta & \sin\phi\sin\theta\sin\psi + \cos\phi\cos\psi & \sin\phi\sin\theta\cos\psi - \cos\phi\sin\psi & Y_{trans} \\ -\sin\theta & \cos\theta\sin\psi & \cos\theta\cos\psi & Z_{trans} \\ 0 & 0 & 0 & 1 \end{bmatrix}$$

where $\psi$, $\Theta$ and $\psi$ are the azimuth, elevation and roll edges, respectively, and Xtrans, Ytrans and Ztrans are translations along the three principle axes. The above 3×3 rotation matrix, shown in brackets, is actually the product of three 3×3 rotation transformation matrices—one for each simple rotation about the three axes. PHIGS builds this matrix by multiplying three rotation matrices in the following order: Z rotation, Y rotation and X rotation.

Undo Function

The Undo function allows designers to sequentially undo previously performed design operations. At the start of every design operation, the entire Winged-Edge data structure is loaded onto a stack of a specified length. In addition to the sheet metal data structure, 3-D position and orientation information about the virtual input device is also pushed onto the Undo stack. Successive closings of the Undo button pop the stored data models off the stack and load them into the winged-Edge data structure for display. Depending on the stack length and complexity of the part, this method of implementing the Undo feature can consume large volumes of space in memory.

We claim:
1. A computer aided design system comprising:
a data processor receiving data inputs and generating in response thereto a representation of an object under design;
a display monitor receiving the representation generated by the data processor and providing a visual display of the representation to a system user; and
a hand-held input device providing data inputs to the data processor, the input device representing a simulation of the object under design such that changes in shape of the input device due to manual manipulation thereof result in changes to the shape of the representation generated by the data processor, wherein the input device comprises a hinge holding two pieces of the input device together, the input device bending at the hinge as a result of manual manipulation of the input device, the bending of the input device generating an output to the data processor which results in a similar bending of the representation generated by the data processor.

2. A computer aided design system according to claim 1 further comprising an orientation sensor providing an output to the data processor indicative of the spatial orientation of the input device.

3. A computer aided design system according to claim 2 wherein the orientation sensor further comprises a magnetic source stationary relative to a magnetic sensor which moves with the input device.

4. A computer aided design system according to claim 1 wherein the input device further comprises a compression switch activated by a compressing of the input device during manual manipulation thereof, activation of the compression switch producing a data input to the data processor which results in a reduction in size of the representation generated by the data processor.

5. A computer aided design system according to claim 1 wherein the input device further comprises an expansion switch activated by an expanding of the input device during manual manipulation thereof, activation of the expansion switch producing a data input to the data processor which results in an increase in size of the representation generated by the data processor.

6. A computer aided design system according to claim 1 wherein the data processor in response to said data inputs further generates a display icon output to the display monitor in addition to said representation, the spatial orientation of the icon following the spatial orientation of the input device and being controllable independent of the spatial orientation of said representation.

7. A computer aided design system comprising:
an input device generating data inputs in response to manipulation thereof, wherein the input device comprises a hinge holding two pieces of the input device together, the input device bending at the hinge as a result of manual manipulation of the input device;
a data processor receiving the data inputs and generating in response thereto a representation of an object under design, the input device providing data inputs to the data processor, the input device representing a simulation of the object under design such that changes in shape of the input device due to manual manipulation thereof result in changes to the shape of the representation generated by the data processor, the bending of the input device generating an output to the data processor which results in a similar bending of the representation generated by the data processor;
a display monitor providing a visual display of said representation; and
a display icon generated by the data processor and displayed on the display monitor in addition to said representation, the display icon on the display monitor moving in response to movement of the input device while being confined to displayed surfaces of said representation.

8. A computer aided design system according to claim 7 wherein the screen icon conforms to a perspective display of said displayed representation such that an apparent spatial orientation of the screen icon corresponds to an apparent spatial orientation of a displayed surface of said representation to which the icon is confined.

9. A computer aided design system according to claim 8 wherein horizontal and vertical movement of the icon on the display screen correspond to horizontal and vertical movement of the input device in a plane parallel to the display screen, and movement of the input device perpendicular to the display screen corresponds to vertical movement of the icon on the display screen.

10. A method of performing a computer aided design comprising:
providing a data processor receiving data inputs and generating in response thereto a representation of an object under design;
receiving the representation generated by the data processor with a display monitor and providing a visual display of the representation to a system user; and
providing data inputs to the data processor with a hand-held input device, the input device representing a simulation of the object under design such that changes in shape of the input device due to manual manipulation thereof result in changes to the shape of the representation generated by the data processor, wherein providing data inputs to the data processor includes closing a bend switch on the input device and bending the input device about a hinge to generate an input to the data processor which results in a bending of the representation generated by the data processor which mimics the bending of the input device.

11. A method according to claim 10 further comprising providing an orientation sensor which generates data inputs received by the data processor which indicate the spatial orientation of the input device.

12. A method according to claim 11 wherein providing an orientation sensor further comprises providing a magnetic source which is stationary relative to a magnetic sensor which moves with the input device.

13. A method according to claim 10 further comprising displaying a display icon on the display monitor in addition to said representation, the spatial orientation of the icon on the display monitor being changeable with changes in the spatial orientation of the input device.

14. A method according to claim 13 wherein closing a bend switch on the input device further comprises closing a bend switch on the input device to generate an input to the data processor which results in a snap grid showing a bend axis extending from the display icon being displayed on the display monitor, the bending of the representation being about the bend axis.

15. A method according to claim 10 wherein providing data inputs to the data processor further comprises compressing the input device to activate a compression switch which provides an input to the data processor which results in a reduction in size of the representation generated by the data processor.

16. A method according to claim 10 wherein providing data inputs to the data processor further comprises expanding the input device to activate an expansion switch which provides an input to the data processor which results in an increase in size of the representation generated by the data processor.

17. A method according to claim 10 further comprising displaying a display icon on the display monitor in addition to said representation, the spatial orientation of the icon on the display monitor being changeable with changes in the spatial orientation of the input device.

18. A method according to claim 17 wherein displaying a display icon comprises displaying a display icon which is shaped like the input device.

19. A method according to claim 17 further comprising providing a move switch on the input device which when closed causes the position of the displayed icon to change with changes in the spatial orientation of the input device.

20. A method according to claim 17 wherein the displayed icon is restricted to portions of the display where it overlaps the displayed representation.

21. A method according to claim 10 wherein providing data inputs to the data processor includes providing data inputs which cause the representation to be cut along an indicated cutting axis, such that the representation is separated into two virtual pieces, and a selected piece is retained.

22. A method according to claim 21 wherein providing data inputs to cut the representation along a cutting axis comprises orienting the input device to indicate the orientation of the cutting axis, and providing a cut signal to the data processor to initiate the cutting of the representation along the indicated cutting axis.

23. A method according to claim 22 further comprising displaying a display icon which overlaps the representation and which has a position on the screen which is changeable with changes in spatial orientation of the input device, the cutting axis being located relative to the position of the icon.

24. A method according to claim 23 wherein providing data inputs to the data processor to cut the representation includes closing a cut switch located at the input device, a closing of the cut switch resulting in a snap grid showing the cutting axis extending from the display icon being displayed on display monitor, an opening of the cut switch resulting in the cutting of the representation along the cutting axis shown by the snap grid at the time the cut switch is open.

25. A method according to claim 10 wherein providing data inputs to the data processor further comprises providing a lock switch at the input device which when closed generates inputs to the data processor which result in the orientation of the representation displayed on the display monitor being changeable with changes in orientation of the hand-held input device.

26. A method according to claim 10 wherein providing data inputs to the data processor includes providing a punch switch on the input device which generates an input to the data processor which results in a hole being punched in the representation displayed on the display monitor.

27. A method according to claim 26 further comprising displaying a display icon on the display monitor in addition to the representation, the spatial orientation of the icon on the display monitor being changeable with changes in the spatial orientation of the input device, a first closing of the punch switch resulting in the center of the hole to be punched being located at the location of the icon, and a second closing of the punch switch resulting in the radius of the hole being established by the position of the icon relative to the center of the hole, the opening of the punch switch after said second closing thereof resulting in the hole being made and a portion of the representation located with the defined hole being deleted from the representation.

28. A method according to claim 10 wherein providing inputs to the data processor further comprises providing embossing inputs to the data processor which result in the creation of an embossing line on the representation, the location of the embossing line being specified by the spatial orientation of the input device at the time the embossing inputs are received by the data processor.

29. A computer aided design system comprising:
   a data processor receiving data inputs and generating, in response thereto, a three-dimensional representation of an object under design,
   a display monitor receiving the representation generated by the data processor and providing a two-dimensional visual display of the representation, the representation being displayed in perspective;
   a hand-held input device providing data inputs to the data processor, the input device representing a simulation of the object under design such that changes in shape of the input device due to manual manipulation thereof result in changes to the shape of the representation generated by the data processor which mimic the changes in shape to the input device, said changes in shape to the representation including bending of the representation in response to bending of the input device and changes in size of a portion of the representation relative to other portions of the representation in response to compressing and expanding of the input device, wherein the input device comprises a bend switch which when closed provides an input to the data processor to cause the representation to bend in response to bending of the input device, and wherein the data processor generates a display icon which is displayed on the display monitor in addition to said representation, the spatial orientation of the icon on the display monitor being changeable with the spatial orientation of the input device; and
   an orientation sensor providing an input to the data processor indicative of the spatial orientation of the input device, wherein the orientation sensor comprises a magnetic source stationary relative to a magnetic sensor which moves with the input device.

30. A computer aided design system according to claim 29 wherein the screen icon conforms to the perspective view of the displayed representation such that when the icon overlaps a surface of the representation, an apparent spatial orientation of the screen icon corresponds to an apparent spatial orientation of the displayed surface which the icon overlaps.

31. A computer aided design system according to claim 29 wherein horizonatal and vertical movement of the icon on the display screen correspond to horizontal and vertical movement of the input device in a plane parallel to the display screen, and movement of the input device perpendicular to the display screen corresponds to vertical movement of the icon on the display screen.

32. A computer aided design system according to claim 29 wherein an orientation of the icon relative to the representation indicates a bend axis along which the representation is bent when the bend switch is activated and the input device is bent.

33. A computer aided design system according to claim 29 wherein the input device further comprises a move switch which when closed provides an input to the data processor which results in the orientation of the displayed icon changing with changes in spatial orientation of the input device.

34. A computer aided design system according to claim 29 wherein the input device further comprises a cut switch which provides inputs to the data processor which result in a cut being made in the representation, a line along which the representation is cut being determined by the orientation of the display icon when the inputs from the cut switch are received.

35. A computer aided design system according to claim 34 wherein inputs from the cut switch allow an arcuate cut to be made in the representation.

36. A computer aided design system according to claim 29 wherein the input device further comprises a lock switch which provides an input to the data processor which causes the orientation of the representation to change in response to changes in spatial orientation of the input device.

37. A computer aided design system according to claim 36 wherein the input device further comprises an undo switch which provides inputs to the data processor which result in a previous modification to the representation being deleted, and the state of the representation being returned to that which it was in prior to said previous modification.

38. A computer aided design system according to claim 29 wherein the representation displayed by the display monitor represents a sheet metal part.

39. A computer aided design system according to claim 29, wherein in addition to the representation generated by the data processor and unfolded view of the representation is also generated by the data processor and displayed by the display monitor, the unfolded view appearing as a two dimensional view of the representation without any bends, and being shown in a display window of the display monitor.

40. A method of performing a computer aided design, the method comprising:
  providing a data processor receiving data inputs and generating in response thereto a representation of an object under design;
  providing a display monitor receiving the representation generated by the data processor and providing a visual display of the representation;
  inputting data to the data processor with a hand-held input device, the input device representing a simulation of the object under design such that changes in shape of the input device due to manual manipulation thereof result in changes to the shape of the representation generated by the data processor which mimic the changes in shape to the input device, wherein providing data inputs to the data processor includes closing a bend switch on the input device and bending the input device about a hinge to generate an input to the data processor which results in a bending of the representation generated by the data processor which mimics the bending of the input device;
  generating with the data processor a screen icon which is displayed on the display screen in addition to the representation, the screen icon on the display screen being moveable in response to movements of the input device while being confined to display surfaces of the representation; and
  retaining the representation generated by the data processor by storing in a data processor memory a listing of edges, faces and vertices of the displayed representation which define the representation generated by the data processor.

41. A method according to claim 40 further comprising placing a bend in the representation by following the steps of:
  i) locating the position of the screen icon with the data processor and determining a bend axis therefrom;
  ii) marking in data processor memory vertices of the representation to be rotated during bending;
  iii) dividing a specified face of the representation to be bent into new vertices, edges and faces; and
  iv) bending the representation about the indicated bend axis in response to inputs from the input device generated by a bending of the input device.

42. A method according to claim 40 further comprising placing a cut in the representation by following the steps of:
  i) locating the position and orientation of the icon, and establishing a cut line in correspondence thereto:
  ii) receiving inputs from the input device with the data processor, which establish parameters of the cut and modifications to the cut line;
  iii) creating a cut in the representation along the cut line in response to inputs from the input device;
    removing material of the representation severed by the cut in response to inputs from input device.

43. A method according to claim 40 further comprising increasing the size of the representation along one dimension by following the steps of:
  i) locating the position and orientation of the screen icon relative to the representation;
  ii) generating a stretch vector in response to an input from the input device.
  iii) marking in data processor memory vertices of the representation to be translated during the size increase; and
  iv) responding to an input from the input device to translate the marked vertices.

44. A method according to claim 40 further comprising reducing the size of the representation along one dimension by following the steps of:
  i) locating the position and orientation of the screen icon relative to the representation;
  ii) generating a shrink vector in response to an input from the input device;
  iii) marking in data processor memory vertices of the representation to be translated during the size reduction; and
  iv) translating the marked vertices in response to a shrink input from the input device.

* * * * *